(12) United States Patent
Osborne et al.

(10) Patent No.: US 10,664,007 B2
(45) Date of Patent: May 26, 2020

(54) TECHNIQUES FOR JOINING ONE OR MORE STRUCTURES OF AN ELECTRONIC DEVICE

(71) Applicant: Apple Inc., Cupertino, CA (US)

(72) Inventors: Steven J. Osborne, Sunnyvale, CA (US); Joss N. Giddings, San Francisco, CA (US); Adam T. Garelli, Santa Clara, CA (US); William F. Leggett, San Jose, CA (US); Sarah J. Montplaisir, Pacifica, CA (US); Eric T. Corriveau, Bristol, CT (US); Tyler J. Ewing, San Jose, CA (US)

(73) Assignee: APPLE INC., Cupertino, CA (US)

( * ) Notice: Subject to any disclaimer, the term of this patent is extended or adjusted under 35 U.S.C. 154(b) by 46 days.

(21) Appl. No.: 16/137,461

(22) Filed: Sep. 20, 2018

(65) Prior Publication Data
US 2019/0025874 A1    Jan. 24, 2019

Related U.S. Application Data

(63) Continuation of application No. 15/160,054, filed on May 20, 2016, now Pat. No. 10,120,409.
(Continued)

(51) Int. Cl.
*G06F 1/16* (2006.01)
*H05K 5/00* (2006.01)
(Continued)

(52) U.S. Cl.
CPC .............. *G06F 1/16* (2013.01); *B23K 1/0016* (2013.01); *B23K 1/06* (2013.01); *B23K 1/19* (2013.01);
(Continued)

(58) Field of Classification Search
CPC ........ G06F 1/16; G06F 1/1633; G06F 1/1662; G06F 1/1656; G06F 1/1613
(Continued)

(56) References Cited

U.S. PATENT DOCUMENTS 7,582,500 B2 *   9/2009   Chou ................... G01N 27/414
                                                              438/49
7,583,500 B2     9/2009   Ligtenberg et al.
(Continued)

FOREIGN PATENT DOCUMENTS

CN          1353023         6/2002
CN          1441633         9/2003
(Continued)

*Primary Examiner* — Anthony M Haughton
(74) *Attorney, Agent, or Firm* — Brownstein Hyatt Farber Schreck, LLP

(57) ABSTRACT

Techniques for bonding structural features together in an enclosure of an electronic device are disclosed. A structural feature may be ultrasonically soldered to the enclosure to provide structural support and form a magnetic circuit within the device. Also, ultrasonic welding can bond various features to an interior region of the enclosure without leaving a mark or trace to an exterior region of the enclosure in a location corresponding to the various features. Further, one or more features can be actuated against the enclosure to bond the one or more features by friction welding. In addition, a rotational friction welding machine can rotate a feature having a relatively small diameter at relatively high speeds against the enclosure to drive the feature into the enclosure and frictionally weld the feature with the enclosure. Also, the friction welding does not leave any an appearance of cosmetic deformation on the exterior region.

20 Claims, 27 Drawing Sheets

Related U.S. Application Data

(60) Provisional application No. 62/164,399, filed on May 20, 2015.

(51) Int. Cl.
| | | |
|---|---|---|
| *H05K 7/00* | (2006.01) | |
| *B23K 1/00* | (2006.01) | |
| *B23K 1/06* | (2006.01) | |
| *B23K 1/19* | (2006.01) | |
| *B23K 20/10* | (2006.01) | |
| *B23K 20/227* | (2006.01) | |
| *B23K 20/233* | (2006.01) | |
| *B23K 103/04* | (2006.01) | |
| *B23K 103/08* | (2006.01) | |
| *B23K 103/10* | (2006.01) | |
| *B23K 103/18* | (2006.01) | |

(52) U.S. Cl.
CPC ............ *B23K 20/10* (2013.01); *B23K 20/106* (2013.01); *B23K 20/227* (2013.01); *B23K 20/2275* (2013.01); *B23K 20/233* (2013.01); *B23K 20/2336* (2013.01); *G06F 1/1633* (2013.01); *B23K 2103/05* (2018.08); *B23K 2103/08* (2018.08); *B23K 2103/10* (2018.08); *B23K 2103/18* (2018.08)

(58) Field of Classification Search
USPC ............... 361/679.55, 679.56, 679.21–679.3
See application file for complete search history.

(56) References Cited

U.S. PATENT DOCUMENTS

| | | | | |
|---|---|---|---|---|
| 8,138,869 | B1 * | 3/2012 | Lauder | G06F 1/1613 335/219 |
| 8,143,983 | B1 * | 3/2012 | Lauder | G06F 1/1626 335/219 |
| 8,223,489 | B2 * | 7/2012 | Shih | E05C 19/16 361/679.55 |
| 8,638,549 | B2 * | 1/2014 | Garelli | G06F 1/1615 361/679.26 |
| 8,797,721 | B2 | 8/2014 | Pakula et al. | |
| 2010/0270052 | A1 | 10/2010 | Crohas et al. | |
| 2012/0099264 | A1 * | 4/2012 | Degner | G06F 1/1616 361/679.09 |
| 2013/0255875 | A1 | 10/2013 | Villarreal | |
| 2013/0328741 | A1 * | 12/2013 | Degner | G06F 1/1658 343/841 |
| 2013/0329359 | A1 * | 12/2013 | Andre | G06F 1/1616 361/679.55 |
| 2013/0329396 | A1 | 12/2013 | Smith et al. | |
| 2013/0329450 | A1 * | 12/2013 | Degner | G06F 1/1616 362/602 |
| 2014/0111929 | A1 * | 4/2014 | Andre | G06F 1/1656 361/679.27 |
| 2018/0218859 | A1 * | 8/2018 | Ligtenberg | H01H 13/85 |
| 2018/0314304 | A1 * | 11/2018 | Degner | G06F 1/1662 |

FOREIGN PATENT DOCUMENTS

| | | |
|---|---|---|
| CN | 201741412 | 2/2011 |
| CN | 102133685 | 7/2011 |
| CN | 202748695 | 2/2013 |
| CN | 104010463 | 8/2014 |
| CN | 104219907 | 12/2014 |

* cited by examiner

TECHNIQUES FOR JOINING ONE OR MORE STRUCTURES OF AN ELECTRONIC DEVICE

CROSS-REFERENCE TO RELATED APPLICATION(S)

This application is a continuation patent application of U.S. patent application Ser. No. 15/160,054, filed May 20, 2016 and titled "Techniques for Joining One or More Structures of an Electronic Device," which is a nonprovisional patent application of and claims the benefit of U.S. Provisional Patent Application No. 62/164,399, filed May 20, 2015 and titled Techniques for Joining One or More Structures of an Electronic Device," the disclosures of which are hereby incorporated herein by reference in their entireties.

FIELD

The described embodiments relate generally to electronic device enclosures. In particular, the present embodiments relate to various bonding and joining techniques between multiple features to electronic device enclosures.

BACKGROUND

An enclosure of an electronic device is generally associated a protective cover for several internal components of the electronic device. There is a general trend to decrease the overall form factor of electronic devices and in turn the enclosure. For example, an enclosure of a laptop computing device may be formed from aluminum having a reduced thickness. A decrease in enclosure thickness may correspond to an enclosure with reduced strength and rigidity.

One method for increasing the strength and rigidity of the enclosure requires adhesively securing a rigid structure to an interior region of the enclosure. However, the bond strength between rigid structure and the enclosure is typically insufficient and the rigid structure may become detached from the enclosure. Further, when the rigid structure and the enclosure are formed from a metal, the adhesive includes a thermal conductively substantially less than that of the rigid structure and the enclosure. Accordingly, the adhesive may act as a thermal barrier between the rigid structure and the enclosure, causing heat generated from internal components may to remain in the electronic device rather than dissipate from the electronic device. This may lead to damage to the internal components, and in turn, the electronic device.

SUMMARY

In one aspect, a method for forming an electronic device having an enclosure that includes a first part and a second part rotatably coupled with the first part is described. The second part may include a magnet. The method may include engaging an attachment feature with a bonding tool configured to bond the attachment feature with the first part. The method may further include actuating the attachment feature via the bonding too that causes a solder material disposed between the attachment feature and the first part to melt and bond the attachment feature with the first part.

In another aspect, a method for solid-state bonding a first part with a second part at a joint region is described. The first part may be formed of a first type material and the second part formed from a second type material dissimilar to the first type material. The method may include applying a force by a bonding tool to the first part when the first part is in contact with the second part at the joint region. The method may further include actuating, by the bonding tool, the first part in a repeated manner with respect to the second part in a first direction and subsequently in a second direction opposite the first direction such that at least some of the first type material intermingles with at least some of the second type material within the joint region while applying the force.

In another aspect, an electronic device is described. The electronic device may include a base portion that includes a magnet. The method may further include a housing rotatably coupled with the base portion and formed from a first type metal. The housing may include an attachment feature formed from a second type metal different from the first type metal. In some embodiments, in a closed configuration between the base portion and the housing, the second type metal causes the attachment feature to magnetically couple with the magnet to define a magnetic circuit, and the housing is separated from the base portion by a gap that is based upon the magnetic circuit.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
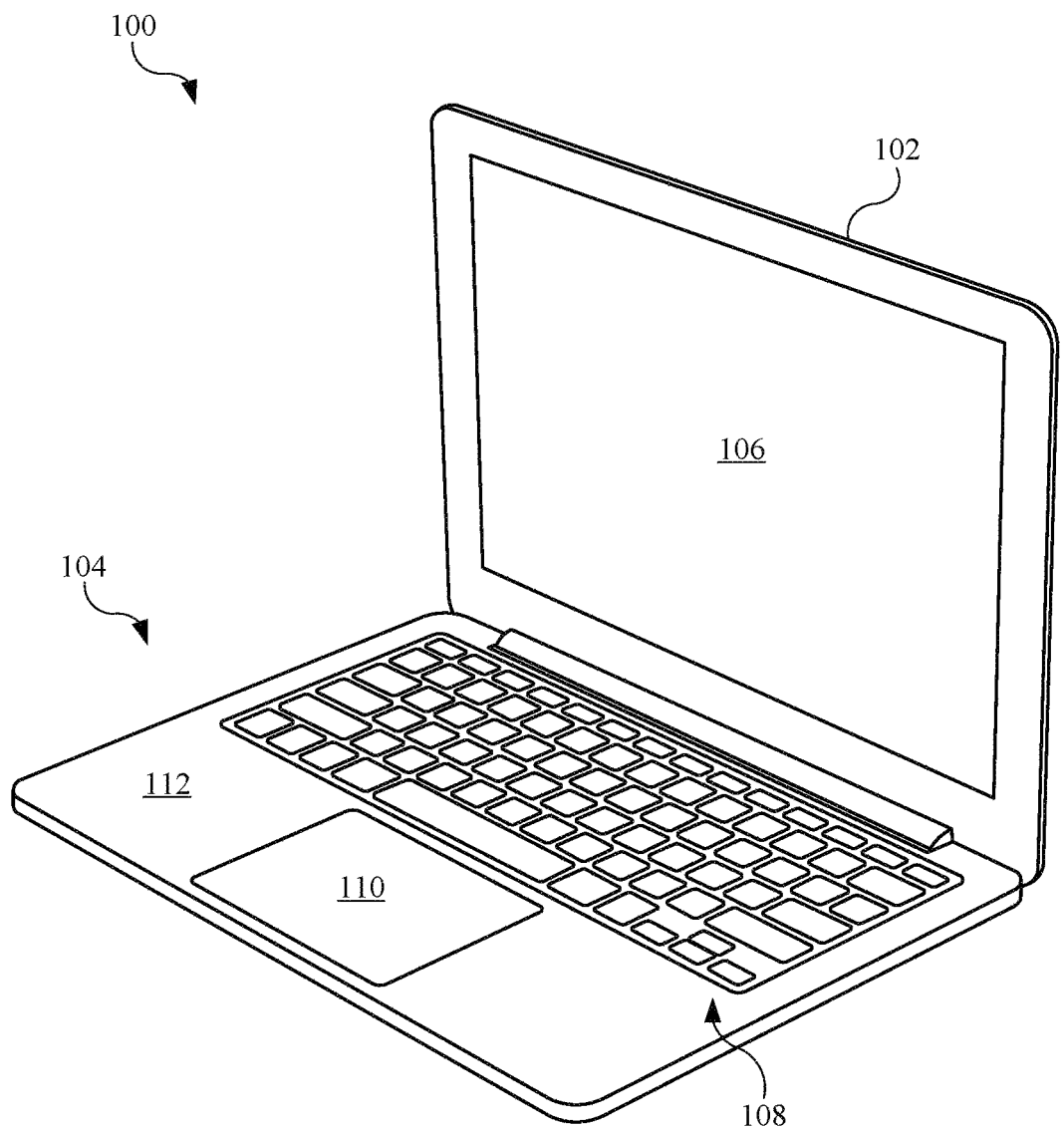
FIG. 1 illustrates an isometric view of an embodiment of an electronic device in an open configuration.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to various techniques for metallurgic bonding or joining two or more structural features to form part of an enclosure, or housing, of an electronic device. The described techniques include variations in soldering and welding. The soldering and welding techniques may include, but are not limited to, ultrasonic soldering, ultrasonic welding (linear and torsional), ultrasonic bonding, and linear friction welding. A substrate defining a portion of the enclosure may include one or more structural features joined by soldering or welding with an interior region of the enclosure. The "interior region" may be defined as a region not visible to a user of the electronic device when the electronic device is fully assembled. In some cases, the substrate includes a thickness of approximately 1 millimeter ("mm") or less. Traditional soldering and welding techniques use relatively high power tools resulting in visible marks, traces, and/or burns that extend through the thickness of the substrate and are visible on an exterior region (opposite the interior region) of the substrate. The "exterior region" may be defined as a cosmetic region that is visible to the user when the electronic device is fully assembled. However, the bonding operations described herein are optimized such that visible marks, traces, and/or burns associated with the bonding operations are not formed on the exterior region. This allows for an enclosure of an electronic device with structural enhancements on the interior region with no visible marks, traces, and/or burns on the exterior region.

Various embodiments of a structural feature or features joined to the enclosure may be used. For example, an attachment feature, or attachment plate, may be bonded to an enclosure by ultrasonic soldering. The enclosure may be formed from a first material or a first type metal, such as aluminum or an aluminum alloy. An ultrasonic soldering tool may be used to generate ultrasonic waves through the attachment feature to soften a solder material disposed between the attachment feature and the enclosure, causing the solder material to reflow and bond together the structural features. The attachment feature may be formed from a magnetically attractable material (such as a ferrous material). Alternatively, the attachment feature may be a magnet. In this manner, in a closed configuration of the electronic device, the attachment feature may be magnetically attracted to another feature located in a base portion of the electronic device, such as a magnet. However, the attachment feature may be formed from a second material or a second type metal, such as titanium, molybdenum, stainless steel, brass, bronze, or the like. Accordingly, the second type material may be different from the first type material. Also, the second type material may include a hardness, strength, and/or durability greater than that of the first type material. As a result, the first type material (or first type metal) may include a first hardness and the second type material (or second type metal) may include a second hardness greater than the first hardness, based upon the material makeup differences between the first type material and the second type material. This allows the enclosure to include a reduced thickness, while the attachment feature (or features) provides a material of a higher strength than that of aluminum to increase the overall rigidity of the enclosure.

Other structural features may be secured with the enclosure by metallurgic bonding. Further, the bonding techniques described herein may include solid-state bonding techniques. A "solid-state bonding technique" may be defines as a bonding operation that does not require a bonding agent, such as a solder material. In other words, a solid-state bonding technique may directly bond together, for example, two or more metal parts. The solid-state bonding techniques described herein may include actuating, or rubbing, a first part against a second part in order to secured the first part with the second part. For example, a component, such as a protruding feature (or protruding features) or a beam feature (or beam features), may be secured with the enclosure by means such as linear ultrasonic welding or torsional ultrasonic welding. Linear ultrasonic welding may include an ultrasonic welding tool that secures the component, engages the component with the enclosure, and drives the component back and forth in a linear direction at a predetermined frequency (or within a frequency range) against the enclosure. Rather than driving the component in a linear direction, torsional ultrasonic welding may include driving the component back and forth along a generally arc-like, or partially circular, path. The linear and torsional ultrasonic bonding techniques include frictional forces which break down metal oxides (of the component and the enclosure) in a joint region defined by a location where the component engages the enclosure, causing a diffusion bond between atoms of the component and the enclosure to diffuse into one another.

In some cases, the protruding feature may be a boss having an internal threaded region designed to receive a threaded fastener. This allows the enclosure that includes one or more bosses to couple with another enclosure feature or internal component by way of a threaded engagement between the threaded fastener (securing the enclosure feature) in threaded engagement with the internal threaded region. Also, the beam feature may be secured by similar welding techniques. The beam feature may include a rectangular I-shaped bar or a T-shaped bar. The beam feature may provide not only additional structural rigidity but also a thermal pathway designed to dissipate heat from a component thermally coupled with the beam feature. The protruding feature and the beam feature may be formed from the second type material previously described. Accordingly, the metallurgic bonding techniques allow for an aluminum enclosure to include a dissimilar metal bonded with the aluminum enclosure. Further, these techniques use a relatively low amount of heat as compared to traditional welding applications. This allows for an enclosure to include one or more structural features welded to an interior region of the enclosure without any visible marks, traces, and/or burns (associated with the described welding techniques) visible on an exterior region of the enclosure.

Also, the welding techniques include an added advantage of controlled placement of the attachment feature. For example, the back and forth motion previously described may displace the attachment feature approximately 10 micrometers, or microns, from an initial starting position prior to the welding process. In this manner, the attachment feature is bonded to the enclosure in a desired location despite continuous displacement of the attachment feature during the welding operation.

Other solid-state bonding techniques may be used to secure multiple structural features to an enclosure. For example, a protruding feature and an intermediate feature may be co-bonded with an enclosure by an ultrasonic bonding technique, with the intermediate feature disposed between the protruding feature and the enclosure. The protruding feature and the enclosure may be formed from an aluminum alloy, while the intermediate feature may include a substantially pure aluminum composition, and accordingly, is relatively soft as compared to the protruding feature and the enclosure. The ultrasonic bonding may cause the intermediate feature to deform or soften, and bond with the protruding feature and the enclosure, while also serving a bonding feature to bond the protruding feature with the enclosure.

Still, additional techniques may be used to bond together two or more structural features. For example, a beam feature may be joined with an enclosure by linear friction welding. Linear friction welding may include a welding tool that provides a relatively large clamping force (to the beam feature) and displacement, as compared to the clamping force and displacement, respectively, of the linear and torsional ultrasonic welding processes. The beam feature may be formed from the second type metal previously described. According, the beam feature may include a different material makeup as compared to, for example, an enclosure. Also, the welding tool engages the beam feature and applies a relatively high force to the enclosure via the beam feature. This engaging force coupled with the relatively large displacement of the beam feature during the welding operation produces a relatively high amount of heat, causing a portion of both the beam feature and the enclosure to soften and swirl together. In some cases, the beam feature includes a strength and rigidity greater than that of the enclosure. In those cases, as a result of the linear friction welding process, the strength and rigidity of the enclosure significantly increases, due in part to the beam feature, despite a reduced thickness of the enclosure.

Also, an additional solid-state bonding technique may include a rotational friction welding tool may be used to combine a protruding feature with an enclosure. The protruding feature may include a cylindrical shape formed from a metal or metal alloy. The tool includes a weld head receives the protruding feature and rotates the protruding feature at relatively high revolutions per minute ("RPM") while engaging the protruding feature with the enclosure. Further, the protruding feature may be rotated at an RPM sufficient to create enough frictional heat in the enclosure, causing the enclosure to soften and allowing protruding feature to be driven and embedded into the enclosure. Traditional rotational friction welding applications involve welding large structures having a diameter much larger than that of the protruding feature. Further, in those applications, visible marks, traces, and/or burns associated with an opposing region are not accounted for as little or no consideration is given with respect to aesthetic features. However, in the embodiments described herein, the rotational friction welding tool is capable of generating sufficient heat to embed the protruding feature into the enclosure, even when the protruding feature includes a diameter of 2 mm. Further, the operation does not produce any visible marks, traces, and/or burns on an exterior or cosmetic region of the enclosure.

These and other embodiments are discussed below with reference to FIGS. 1-45. However, those skilled in the art will readily appreciate that the detailed description given herein with respect to these Figures is for explanatory purposes only and should not be construed as limiting.

FIG. 1 illustrates an isometric view of an embodiment of an electronic device 100 in an open configuration. An "open configuration" refers to a display housing 102 positioned away from the base portion 104, similar to the depiction in FIG. 1. In some embodiments, the electronic device 100 is a tablet computing device. In other embodiments, the electronic device 100 is a desktop computing device. In the embodiment shown in FIG. 1, the electronic device 100 is a laptop computing device. As shown, the display housing 102 may be coupled with the base portion 104 in a manner such that the display housing 102 may be rotated with respect to the base portion 104, or vice versa. The display housing 102 and the base portion 104 may define an enclosure of the electronic device 100. Also, in some embodiments, the display housing 102 and the base portion 104 are made from a first material or first type metal, such as aluminum or an aluminum alloy. The display housing 102 may include a display panel 106 designed to display visual content viewable by a user. Accordingly, the display panel 106 may be an operational component of the electronic device 100, in that the display panel 106 performs an operation based upon an electrical communication. The base portion 104 may include a keyboard assembly 108 and a touch pad 110, both of which are designed to input a gesture to one or more processors (not shown) that may be disposed within the base portion 104. Also, the base portion 104 may include a top case 112 coupled with a bottom case (not shown) to enclosure several electronic components used by the electronic device 100.

Figure 2:
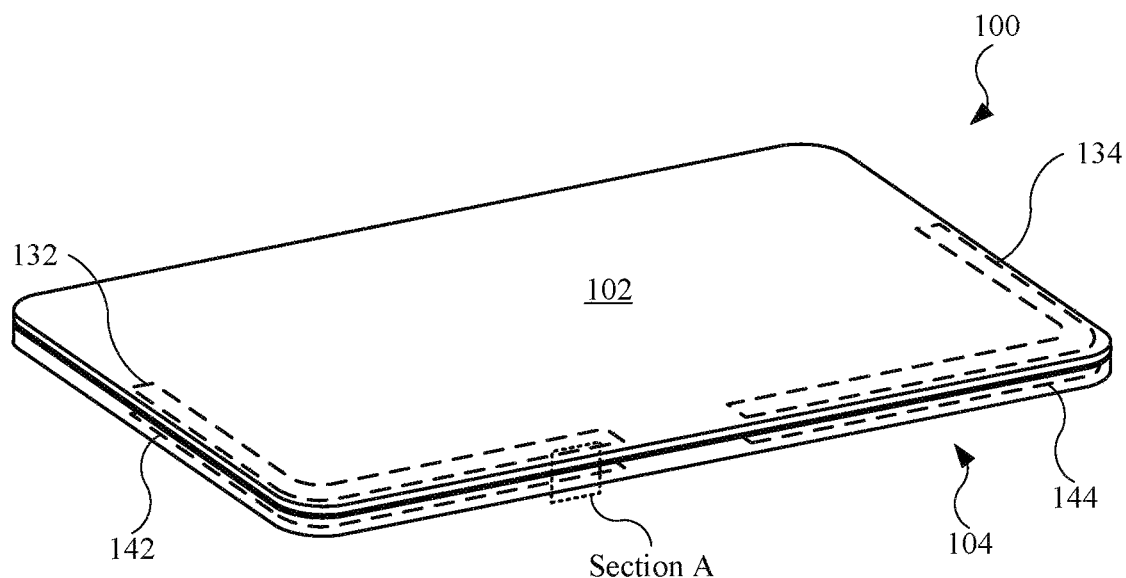
FIG. 2 illustrates an isometric view of the electronic device shown in FIG. 1, showing the electronic device in a closed configuration.

FIG. 2 illustrates an isometric view of the electronic device 100 shown in FIG. 1, showing the electronic device 100 in a closed configuration. The "closed configuration" refers to the display housing 102 proximate to the base portion 104 in the manner shown. The electronic device 100 may include several features designed in part to create a specified distance or gap between the display housing 102 and the base portion 104. For example, the display housing 102 may include a first attachment feature 132 and a second attachment feature 134. In some embodiments, the first attachment feature 132 and the second attachment feature 134 are formed from a magnetically attractable material, such as steel (including stainless steel) or iron. However, the first attachment feature 132 and the second attachment feature 134 may be formed from other magnetically attractable materials. Also, the base portion 104 may include a first magnet 142 and a second magnet 144 in locations corresponding to the first attachment feature 132 and the second attachment feature 134, respectively, such the display housing 102 may magnetically couple with the base portion 104 in the closed configuration by way of the attachment features and the magnets. Generally, the first magnet 142 and the second magnet 144 include a size and a shape corresponding to that of the first attachment feature 132 and the second attachment feature 134, respectively. The arrangement of the structural features may be reversed. For example, in some embodiments, the base portion 104 includes first attachment feature 132 and the display housing 102 includes the first magnet 142. The securing of the structural features to the features of the electronic device 100 will be shown and discussed below.

Figure 3:
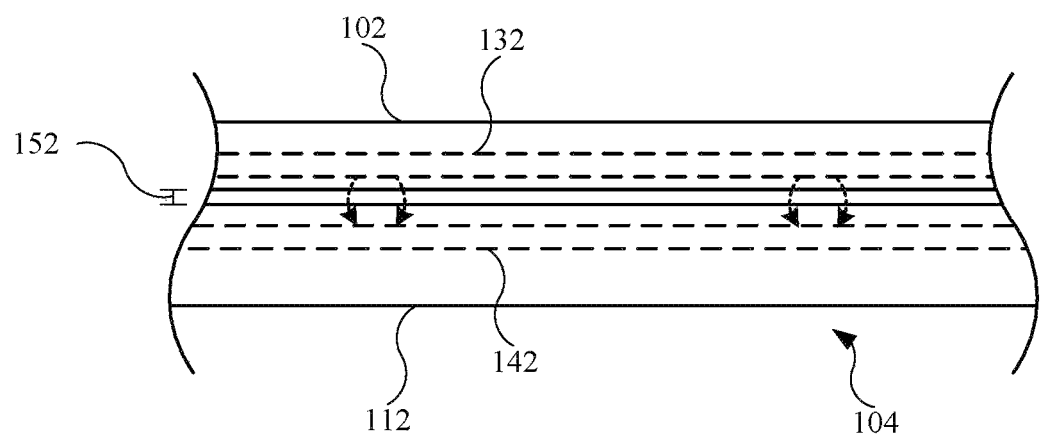
FIG. 3 illustrates a partial side view of the electronic device in the closed configuration, showing an enlarged view of Section A in (FIG. 2), with the display housing separated from the base portion by a gap defined as a space or void between the display housing 102 and the base portion.

FIG. 3 illustrates a partial side view of the electronic device 100 in the closed configuration, showing an enlarged view of Section A in (FIG. 2), with the display housing 102 separated from the base portion by a gap 152 defined as a space or void between the display housing 102 and the base portion 104. Generally, the gap 152 is consistent throughout all regions between the display housing 102 and the base portion 104, and in particular, between the display housing 102 and the top case 112. In this regard, FIG. 3 shows the first attachment feature 132 magnetically coupled with the first magnet 142, causing a relationship between the display housing 102 and the base portion 104 such that the gap 152 is consistent in locations between the display housing 102 and the base portion 104. The magnetically coupling is represented in part by the magnetic field lines in FIG. 3, denoted as dotted lines having arrows. Also, although not shown, the second attachment feature 134 may also magnetically couple with the second magnet 144 (both shown in FIG. 2) to further define the gap 152 as having a consistent distance between the display housing 102 and the base portion 104. Also, the attachment features and the magnets, although not fully extending around the display housing 102 and the base portion 104, may still include a size and a shape, and an associated magnetic coupling, to cause the gap 152 to be of a consistent distance in all locations between the display housing 102 and the base portion 104 in the closed configuration, including locations that do not includes an attachment feature or a magnet.

Figure 4:
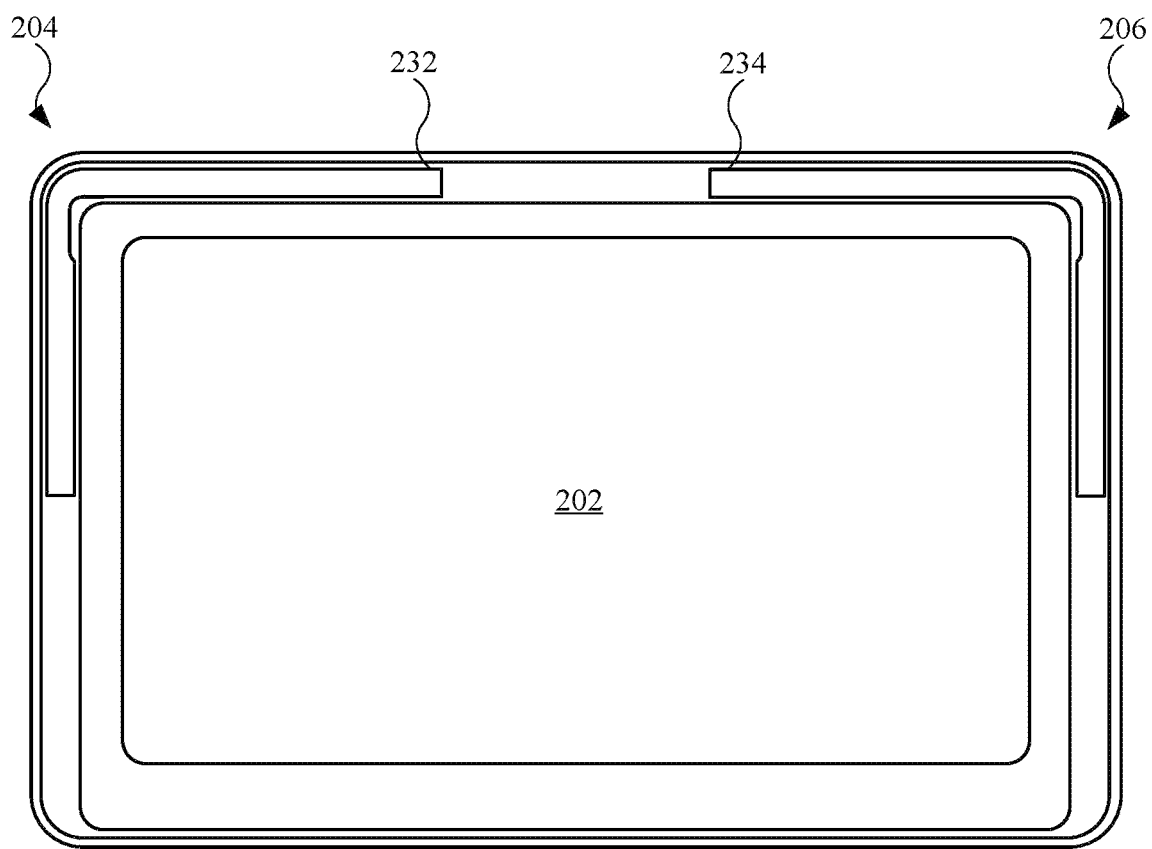
FIG. 4 illustrates a plan view of an enclosure having several attachment features disposed in the enclosure.

FIG. 4 illustrates a plan view of an enclosure 202 having several attachment features disposed in the enclosure 202. In some embodiments, the enclosure 202 is a display housing, similar to the display housing 102 (shown in FIG. 2). In other embodiments, the enclosure 202 is a base portion, similar to the base portion 104 (shown in FIG. 2). Also, in some embodiments, the enclosure 202 is formed from the first type meta, such as aluminum or an aluminum alloy. As shown, the enclosure 202 includes a first attachment feature 232 and a second attachment feature 234 disposed on a first corner 204 and a second corner 206, respectively, of the enclosure 202. The first attachment feature 232 and the second attachment feature 234 may be formed from a metal, or metal alloy, designed to increase the stiffness and structural rigidity of the enclosure 202. For example, the first attachment feature 232 and the second attachment feature 234 may be formed from the second type metal, such as titanium, molybdenum, stainless steel, brass, bronze, or the like. Further, the second type material may be different from the first type material, in that the second type material may include a hardness, strength, and/or durability greater than that of the first type material. Generally, any metal or metal alloy having a relatively high stiffness-to-weight ratio may be used. Accordingly, the first attachment feature 232 and the second attachment feature 234 may be formed from a metal other than a metal used to form the enclosure 202. This allows the enclosure 202 to include a metal having a relatively small weight (based on the weight of aluminum) and a relatively small thickness, such as 1 millimeter or less, and still maintain a similar stiffness and structural rigidity of an enclosure having a greater thickness and accordingly, more material, than that of the enclosure 202. However, in some embodiments, the first attachment feature 232 and the second attachment feature 234 include aluminum.

In some cases, the first attachment feature 232 and the second attachment feature 234 are designed to receive and couple with one or more display mounts used to secured a display panel (such as the display panel 106 in FIG. 1) with the enclosure 202. Also, when the first attachment feature 232 and the second attachment feature 234 are formed from a magnetically attractable material, such as stainless steel, the first attachment feature 232 and the second attachment feature 234 may be designed to not only provide additional stiffness but also magnetically couple with one or more magnets disposed in another structural enclosure of an electronic device. Also, although the first attachment feature 232 and the second attachment feature 234 are disposed around the first corner 204 and the second corner 206, respectively, of the enclosure 202, the first attachment feature 232 and the second attachment feature 234 may be disposed in other locations of the enclosure 202. Also, in other embodiments, a single attachment feature may be disposed along all four corners of the enclosure 202.

Figure 5:
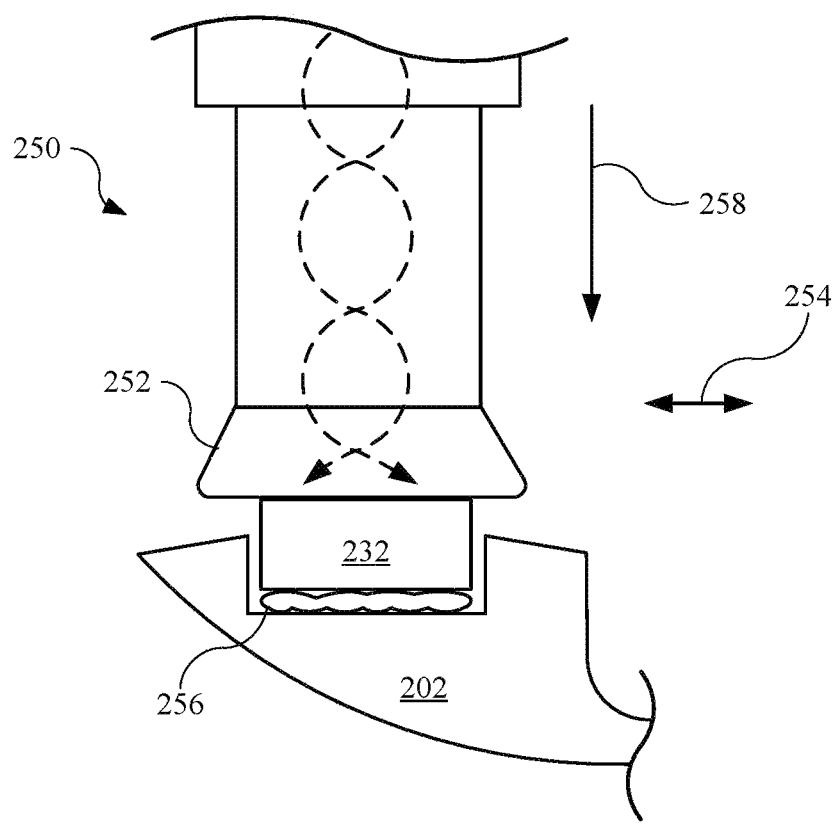
FIG. 5 illustrates a side view of the first attachment feature undergoing a bonding operation to secure the first attachment feature with the enclosure.

In some cases, the attachment features may be adhesively secured. However, the attachment features may be bonded by other means designed to increase the functionality of the attachment features. For example, FIG. 5 illustrates a side view of the first attachment feature 232 undergoing a bonding process to secure the first attachment feature 232 with the enclosure 202. As shown, a bonding tool 250 may engage the first attachment feature 232 to perform a soldering operation. In some embodiments, the bonding tool 250 is an ultrasonic soldering tool designed to apply ultrasonic energy to bond the first attachment feature 232 with the first attachment feature 232 using a solder material 256. As shown, the solder material 256 may be disposed in a channel of the enclosure 2020, and the first attachment feature 232 may be at least partially disposed in the channel of the enclosure 202. The bonding tool 250 may include an ultrasonic horn 252 capable of actuating in a first direction and a second direction opposite the first direction (that is, back and forth) along an axis defined by a linear path (denoted by the arrow 254) delivering ultrasonic energy to the first attachment feature 232 and also to a solder material 256 used to bond the first attachment feature 232 with the enclosure 202. Also, the bonding tool 250 may apply a force (denoted by a second arrow 258) to the first attachment feature 232 in a direction toward the enclosure 202. In some embodiments, the ultrasonic horn 252 may be actuated with a frequency approximately in the range of 10-40 kilohertz ("kHz"). The ultrasonic energy generated from the ultrasonic horn 252 may cause a reflow, or melting, of the solder material 256, which in turn causes the first attachment feature 232 to bond with the enclosure 202. The solder material 256 may include a melting point of approximately 110 degrees Celsius. In this manner, when the enclosure 202 undergoes a chemical (for example, acidic) as part of an anodization process, the solder material 256 does not crack or otherwise damage anodized regions of the enclosure 202 under a reflow condition of the solder material 256. Further, the melting temperature of the solder material 256 is such that the aluminum or aluminum alloy that forms the enclosure 202 is not disturbed, and the enclosure 202 does not become deformed.

Figure 6:
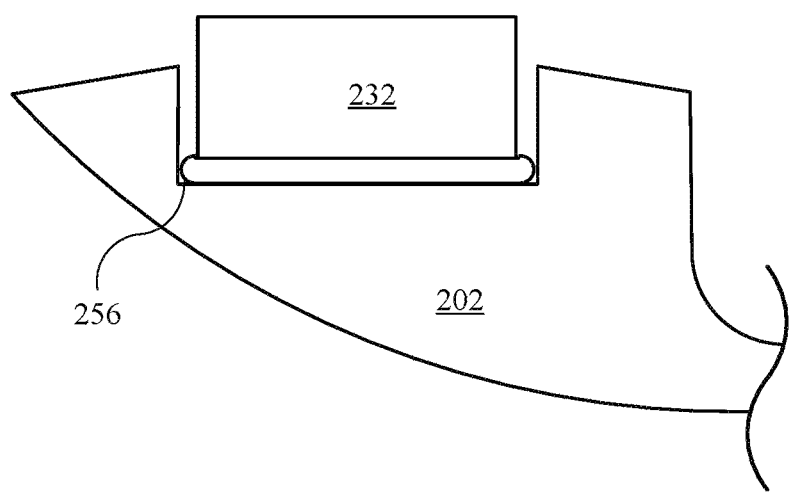
FIG. 6 illustrates a side view of the first attachment feature bonded with the enclosure using the bonding tool shown in FIG. 4.

FIG. 6 illustrates a side view of the first attachment feature 232 bonded with the enclosure 202 using the bonding tool 250 shown in FIG. 4. The solder material 256 may include one or more metals having a thermal conductivity greater than that of an adhesive. In this manner, the first attachment feature 232 may define a thermal pathway used to dissipate or redirect heat away from heat-generating components thermally coupled with the first attachment feature 232, as heat can efficiently pass through the solder material 256 as opposed to an adhesive. Also, empirical testing has shown that the bond strength of the solder material 256 is significantly greater than that of an adhesive, and the first attachment feature 232 is more likely to remain secured with the enclosure 202 when a load or force is applied to the enclosure 202 (for example, in a drop event of the enclosure 202).

Figure 7:
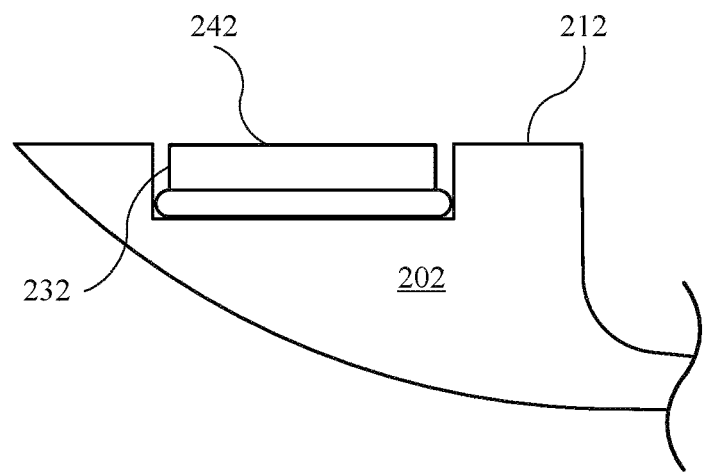
FIG. 7 illustrates a side view of the enclosure and the first attachment feature shown in FIG. 6 after undergoing a material removal operation.

Once the first attachment feature 232 is secured with the enclosure 202, in some embodiments, additional operations are applied. For example, FIG. 7 illustrates a side view of the enclosure 202 and the first attachment feature 232 shown in FIG. 6 after undergoing a material removal operation. The material operation is designed such that an uppermost surface 242 of the first attachment feature 232 is substantially co-planar, or flush, with an uppermost surface 212 of the enclosure 202. In some cases, the co-planarity between the uppermost surfaces previously described is within 10 micrometers. Also, in some instances, a single material removal operation to form the co-planar surfaces also forms a uniform surface roughness across the uppermost surface 212 of the enclosure 202 and the uppermost surface 242 of the first attachment feature 232. Accordingly, the surface roughness of the uppermost surface 212 may be substantially similar to that of the uppermost surface 242.

Figure 8:
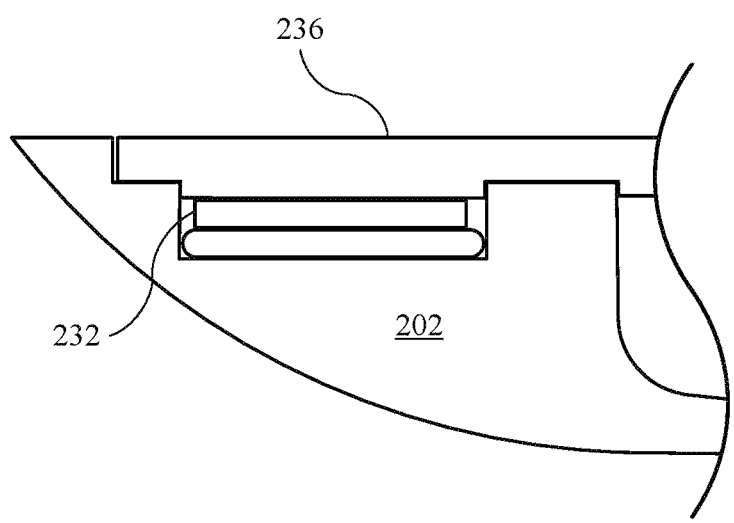
FIG. 8 illustrates a side view of the enclosure and the first attachment feature shown in FIG. 7 with an additional attachment feature secured with the enclosure and the first attachment feature.

Alternatively, or in combination, additional material removal operations may occur to allow additional features to be coupled with the enclosure 202. FIG. 8 illustrates a side view of the enclosure 202 and the first attachment feature 232 shown in FIG. 7 with a third attachment feature 236 secured with the enclosure 202 and the first attachment feature 232. In some embodiments, the third attachment feature 236 extends from the first attachment feature 232 to the second attachment feature 234 (shown in FIG. 3). The third attachment feature 236 may take the form of a support structure for the enclosure 302 and/or a display disposed in the enclosure 202. Also, despite the third attachment feature 236 being positioned over the first attachment feature 232, the first attachment feature 232 may nonetheless be designed magnetically couple with, for example, a magnet (not shown) when the first attachment feature 232 is positioned within magnetic field lines of the magnet.

Referring again to FIG. 2, in some embodiments, the first magnet 142 and the second magnet 144 are secured with the base portion 104 similar to a manner previously described for the first attachment feature 232 and the enclosure 202.

Figure 9:
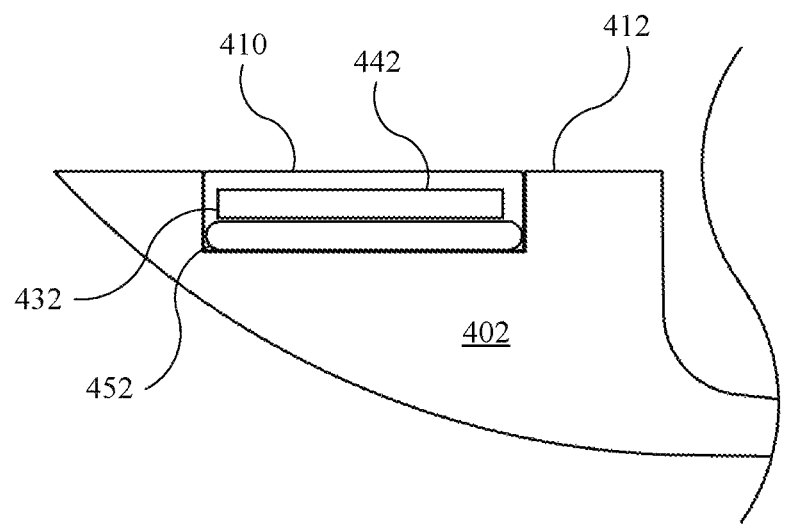
FIG. 9 illustrates a side view of an alternate embodiment of an enclosure having a first attachment feature and a filler material disposed in a space between the first attachment feature, the solder material, and the enclosure.

FIG. 9 illustrates a side view of an alternate embodiment of an enclosure 402 having a first attachment feature 432 and a filler material 410 disposed in a space between the first attachment feature 432, the solder material 452, and the enclosure 402. In some embodiments, the filler material 410 is a potting material that includes a relatively soft plastic material. In this manner, when an uppermost surface 442 of the first attachment feature 432 is not co-planar, or not sub-flush, with respect to an uppermost surface 412 of the enclosure 402, the filler material 410 may be designed to form a continuous, co-planar feature with respect to the uppermost surface 412. Also, although not shown, the filler material 410 may be replaced by glass, including glass beads or glass bond wires, that may be heated causing the glass material to reflow around the first attachment feature 432. This may also assist in controlling reflow of the solder material 452.

Figure 10:
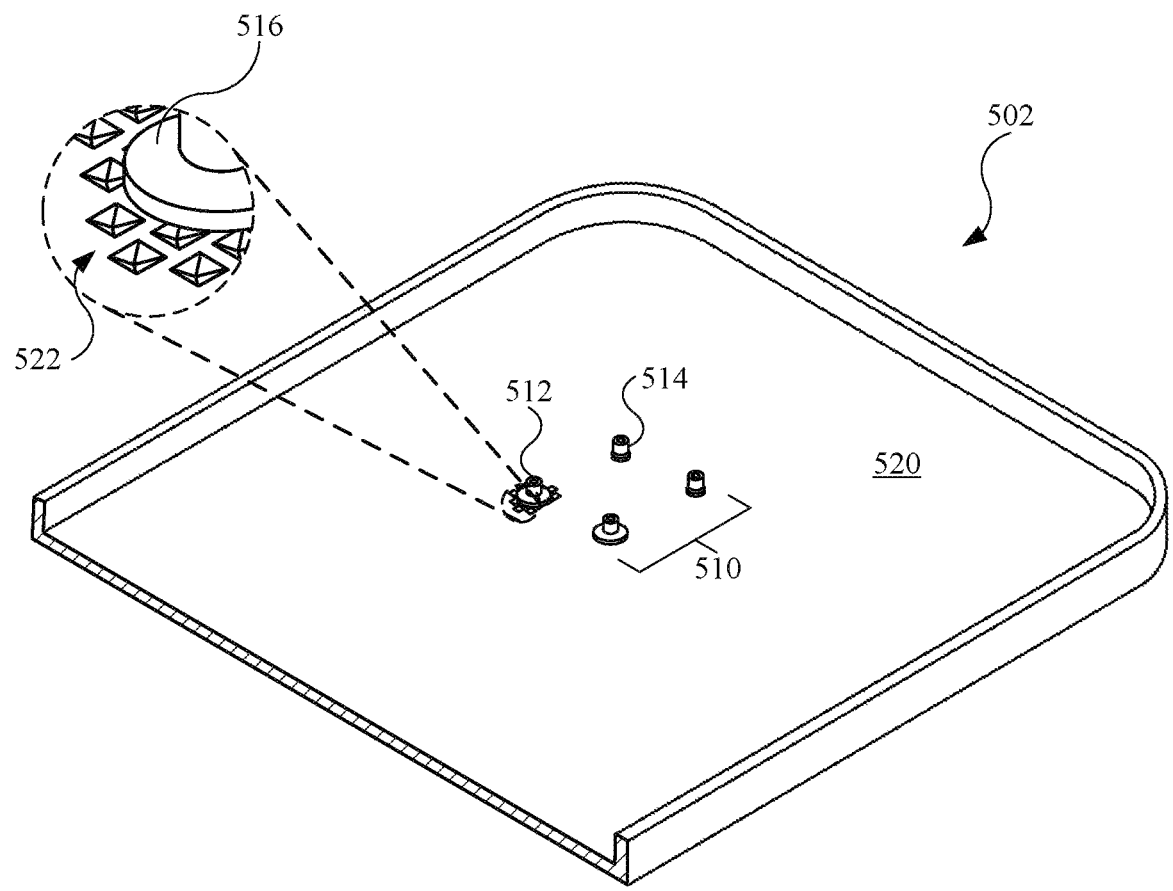
FIG. 10 illustrates an isometric view of an embodiment of a portion of an enclosure that includes several protruding features secured with an interior region of the enclosure.

FIG. 10 illustrates an isometric view of an embodiment of a portion of an enclosure 502 that includes protruding features 510 secured with an interior region 520 of the enclosure 502. The enclosure 502 may be formed from the first type metal previously described. In some embodiments, the protruding features 510 are formed from the second type metal previously described. However, in other embodiments, the protruding features 510 are formed from aluminum. Also, in some embodiments, the protruding features 510 are designed to receive an additional component or other structural feature. As shown, the protruding features 510 include a first protruding feature 512 and a second protruding feature 514. The first protruding feature 512 may include a flange region 516 (partially shown in the enlarged view) designed to provide additional stability as well as a greater surface area for a bonding operation. The second protruding feature 514 may be designed as boss that is received by a corresponding feature of another structural component. Also, in order to enhance the bonding operation, the interior region 520 may include a textured region 522 in a location below which the protruding features 510 are bonded with the enclosure 502. For example, the enlarged view shows the textured region 522 below the first protruding feature 512. This will be discussed below.

In some embodiments, the first protruding feature 512 and the second protruding feature 514 are protrusions designed to engage an opening, or openings, of a component. In other embodiments, the first protruding feature 512 and the second protruding feature 514 include an opening such that the first protruding feature 512 and the second protruding feature 514 can each receive a fastener to fasten a component with the interior region 520. Also, although not shown, the protruding features 510 may be located along various locations of the interior region 520.

Figure 11:
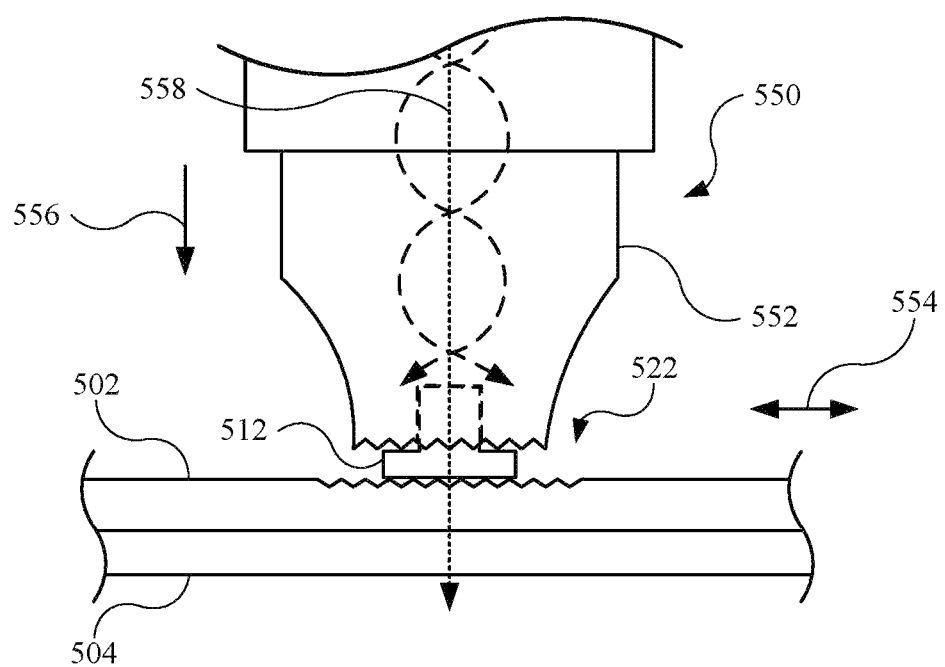
FIG. 11 illustrates a side view of the first protruding feature engaged with a bonding tool to secure the first protruding feature with the enclosure.

FIGS. 11-16 illustrate a solid-state bonding operation used to bond the protruding features 510 directly to an enclosure 502, as shown in FIG. 10. FIG. 11 illustrates a side view of the first protruding feature 512 engaged with a bonding tool 550 to secure the first protruding feature 512 with the enclosure 502. The enclosure 502 may be secured in a fixture 504 (partially shown) during the bonding operation. In some embodiments, the bonding tool 550 is an ultrasonic welding tool. Further, in some embodiments, the bonding tool 550 is a linear ultrasonic welding tool having an ultrasonic horn 552 capable of actuating in a first direction and a second direction opposite the first direction (that is, back and forth) along an axis defined by a linear path (denoted by the arrow 554) delivering ultrasonic energy to the first protruding feature 512. Accordingly, the ultrasonic horn 552 may cause a back and forth motion to the first protruding feature 512. Also, the bonding tool 550 may apply a force to the first protruding feature 512 (denoted by a second arrow 556) in a direction toward the enclosure 502. In some embodiments, the ultrasonic horn 552 may be actuated with a frequency approximately in the range of 10-40 kilohertz ("kHz") and may cause the first protruding feature 512 to be displaced, during the bonding operation, a distance from a centerline 558 (shown as an imaginary line extending through the bonding tool 550) approximately in the range of 7 to 15 micrometers. At these frequencies and relatively small distances, the first protruding feature 512 may be accurately welded at a desired location on the enclosure 502.

Figure 12:
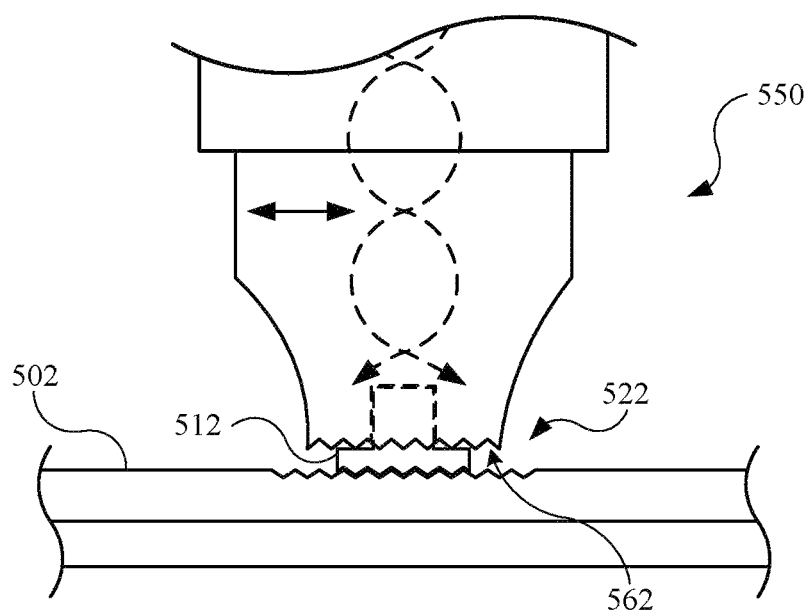
FIG. 12 illustrates a side view of the first protruding feature shown in FIG. 11 with the first protruding feature bonding with the enclosure.

FIG. 12 illustrates a side view of the first protruding feature 512 shown in FIG. 11 with the first protruding feature 512 bonding with the enclosure 502. During the bonding operation, the repeated linear actuation by the bonding tool 550 to the first protruding feature 512 causes metal oxides of both the first protruding feature 512 and the enclosure 502 to break down in a joint region generally defined by a bonding location between the first protruding feature 512 and the enclosure 502. This causes a diffusion bond, and atoms of the first protruding feature 512 and the enclosure 502 may intermingle and diffuse into one another. Also, the textured region 522 of the enclosure 502 and the textured region 562 of the bonding tool 550 facilitate the bonding process by directing the ultrasonic energy to the joint region.

Figure 13:
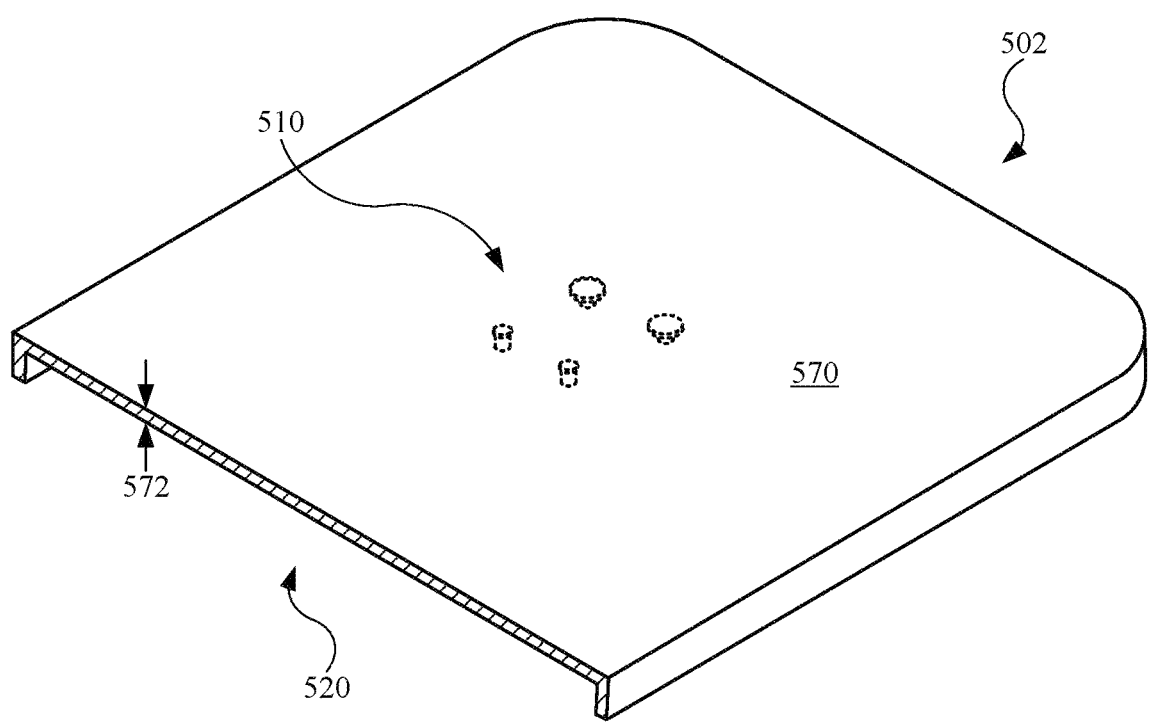
FIG. 13 illustrates an isometric view of an exterior region of the enclosure shown in FIG. 10.

FIG. 13 illustrates an isometric view of an exterior region 570 of the enclosure 502 shown in FIG. 10. For purposes of illustration, the textured region is not shown. The exterior region 570 is generally associated with a cosmetic surface visible to a user when an electronic device (such as the electronic device 100 shown in FIG. 1) is assembled. Despite the linear ultrasonic welding operation previously described, the protruding features 510 are bonded to the interior region 520 without leaving any visible marks, traces, and/or burns on the exterior region 570 from the ultrasonic welding operation. Also, in some embodiments, the enclosure 502 may include a thickness 572 of 3 mm or less. Further, in some embodiments, the thickness 572 is 1 millimeter or less. In either event, the exterior region 570 is free of any marks, traces, and/or burns. This allows for an electronic device that includes an enclosure 502 to include structural enhancements while still providing an aesthetic finish.

Figure 14:
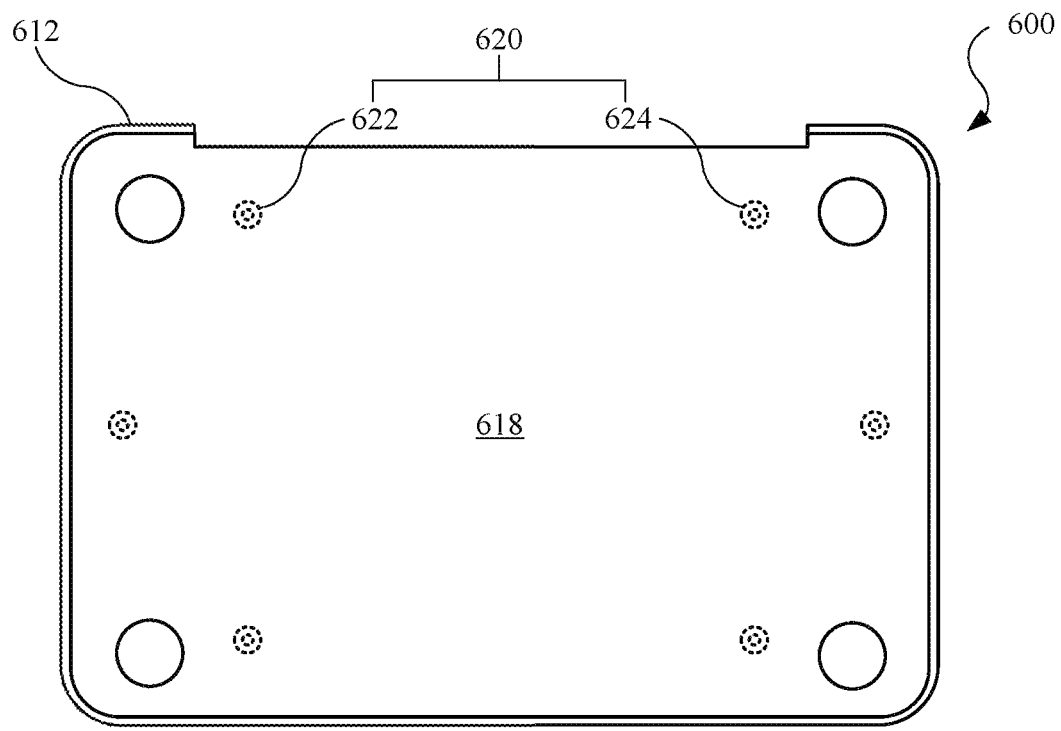
FIG. 14 illustrates a bottom view of an electronic device having several protruding features disposed between a top case and a bottom case of the electronic device.

In additional to receiving internal components, the protruding features can be used in other applications. For example, FIG. 14 illustrates a bottom view of an electronic device 600 having protruding features 620, such as a first protruding feature 622 and a second protruding feature 624, disposed between a top case 612 and a bottom case 618 of the electronic device 600. The electronic device 600 may similar to the electronic device 100 (shown in FIG. 1). The protruding features 620 are shown as dotted lines positioned behind the bottom case 618. The first protruding feature 622 and the second protruding feature 624 may be bonded with the top case 612 by the linear ultrasonic bonding process previously described. Each of the protruding features 620 may be designed to receive a fastener extending from the bottom case 618. In alternate embodiments, the protruding features 620 are bonded with the bottom case 618 and the fasteners extend from the top case 612. The protruding features 620 may provide for two structural features to be secured together without the use of external, or visible, fasteners, which leads to less openings to the environment.

Figure 15:
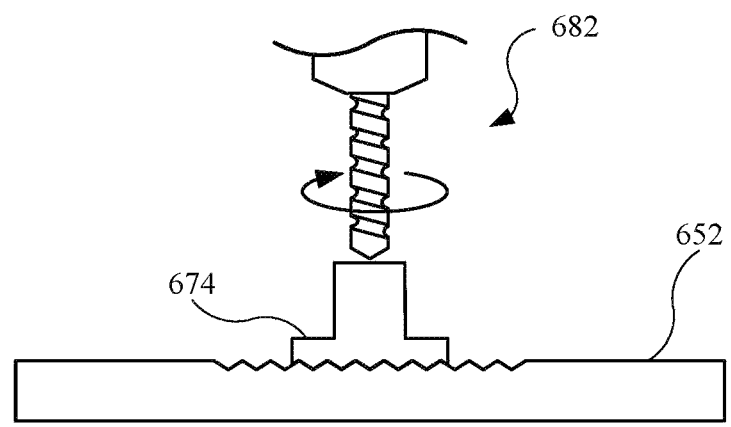
FIG. 15 illustrates a side view a protruding feature bonded with an enclosure, with the protruding feature undergoing a material removal operation.
Figure 16:
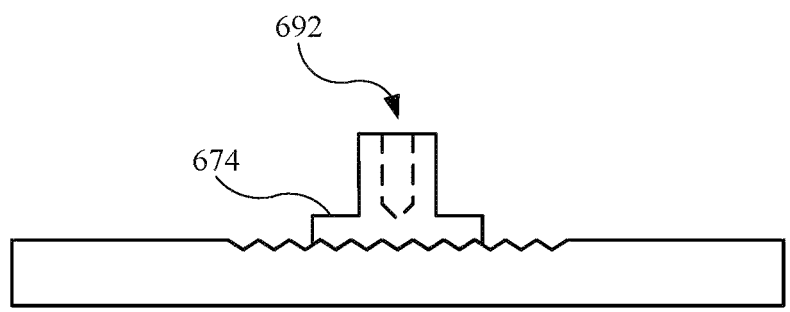
FIG. 16 illustrates a side view of the protruding feature after the material removal process with an internal cavity.

In some embodiments, the protruding features previously described are bonded with an enclosure, and followed by additional processes to form additional features. FIG. 15 illustrates a side view a protruding feature 674 bonded with an enclosure 652, with the protruding feature undergoing a material removal operation. A rotary tool 682 can be used to remove material from the protruding feature 674 to define an internal cavity, which, in some embodiments, includes an internal threaded region designed to receive a threaded fastener. FIG. 16 illustrates a side view of the protruding feature 674 after the material removal process with an internal cavity 692. In this configuration, the protruding feature 674 may be referred to as a boss having an internal cavity 692.

Figure 17:
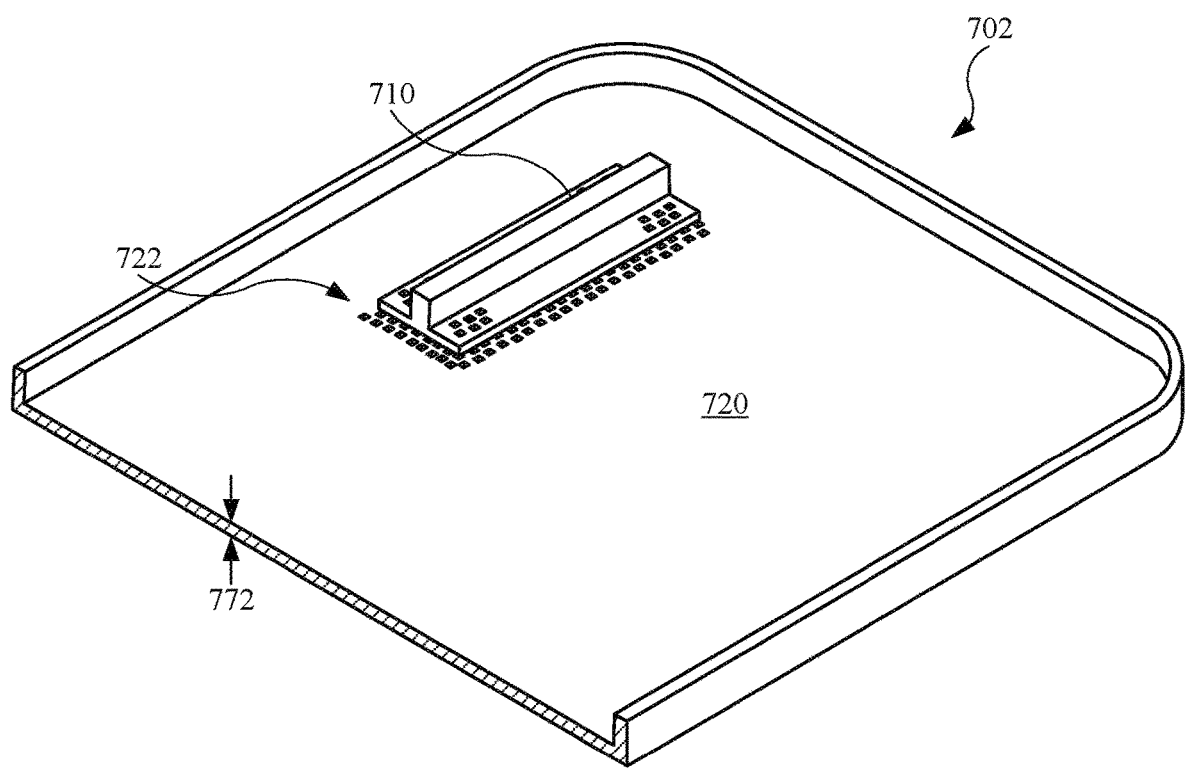
FIG. 17 illustrates an isometric view of a portion of an enclosure including a beam feature secured with an interior region of the enclosure.

FIG. 17 illustrates an isometric view of a portion of an enclosure 702 including a beam feature 710 secured with an interior region 720 of the enclosure 702. The enclosure 702 may part of a structural feature of an electronic device, such as a top case, a bottom case, or a display housing, and may be formed from the first type metal previously described. Also, the beam feature 710 may be formed from the second type metal previously described. However, in other embodiments, the beam feature 710 includes aluminum. The beam feature 710 may include several uses. For example, the beam feature 710 may provide structural support for the enclosure 702, particularly in cases where a thickness 772 of the enclosure 702 is a few millimeters or less. Also, the beam feature 710 may be used in conjunction with one or more beam features (not shown) to receive an internal component used in an electronic device. Also, the beam feature 710 may be used to dissipate or redirect heat away from a heat-generating component (not shown) thermally coupled with the beam feature 710. Further, as shown, the interior region 720 may include a textured region 722 to facilitate the bonding process.

Figure 18:
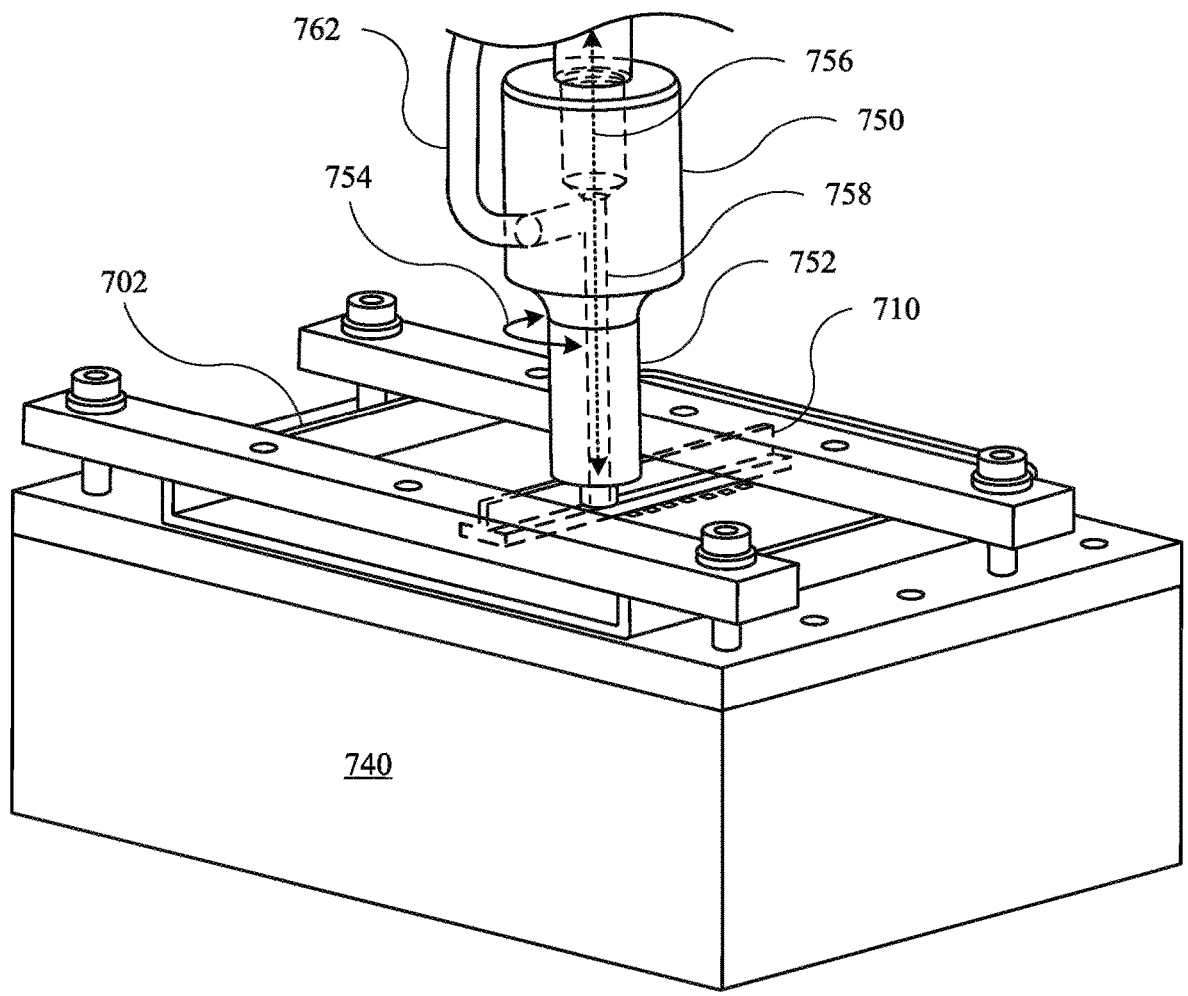
FIG. 18 illustrates an isometric view of an enclosure secured in a fixture and undergoing a bonding operation, in accordance with the described embodiments.

The methods, tools, and techniques shown in FIGS. 18-21 may to form a solid-state bond that directly secures the beam feature 710 with the enclosure 702, shown in FIG. 17. FIG. 18 illustrates an isometric view of the enclosure 702 secured in a fixture 740 and undergoing a bonding process, in accordance with the described embodiments. As shown, the bonding process may include a bonding tool 750. In some embodiments, the bonding tool 750 is an ultrasonic welding tool. Further, in some embodiments, the bonding tool 750 is a torsional ultrasonic welding tool having an ultrasonic horn 752 capable of rotating about a centerline 756 (shown as an imaginary line extending through the bonding tool 750) in a first direction and a second direction opposite the first direction (that is, back and forth in a radial manner) along an arc-like, or partially circular, path (denoted by the arrow 754) delivering ultrasonic energy to the beam feature 710. In some embodiments, the ultrasonic horn 752 may be actuated with a frequency approximately in the range of 10-40 kHz and rotates a distance approximately in the range of 7 to 15 micrometers. Accordingly, during an initial bonding operation, the ultrasonic horn 752 may cause a back and forth motion to the beam feature 710. At these frequencies and relatively small distances, the beam feature 710 is accurately welded at a desired location on the enclosure 702. Also, the bonding tool 750 may include an internal channel 758 that combines with an external channel 762 to form a vacuum channel to supply a vacuum that secures the beam feature 710 with the bonding tool 750 and maintains the beam feature 710 in a desired location.

Figure 19:
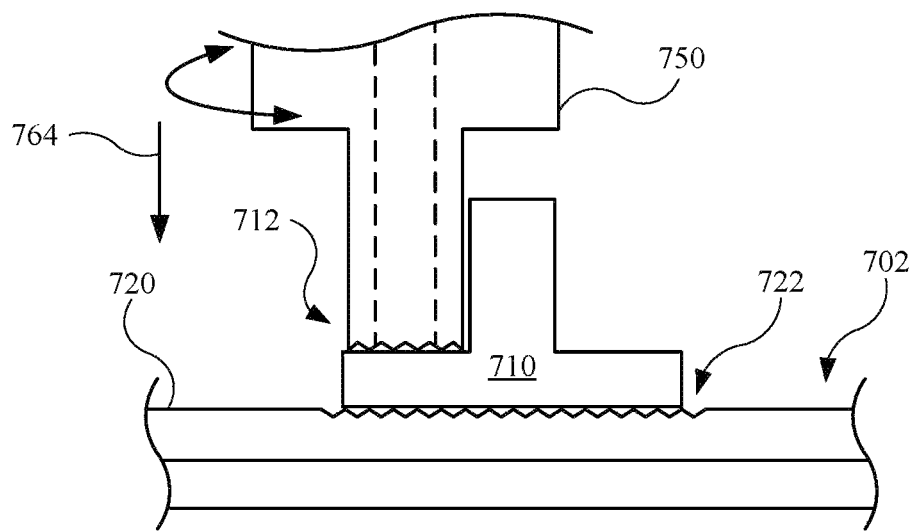
FIG. 19 illustrates a side view of the beam feature undergoing the bonding operation to secure the beam feature with the enclosure.

FIG. 19 illustrates a side view of a beam feature 710 undergoing a bonding operation to secure the beam feature 710 with an enclosure 702, in accordance with the described embodiments. As shown, the bonding tool 750 performs a bonding operation to a first region 712 of the beam feature 710 using a torsional ultrasonic welding operation. The repeated arc-like, or partially circular, movement by the bonding tool 750 causes the first region 712 of the beam feature 710 to secure with the enclosure 702. Also, the bonding tool 750 may apply a force (denoted by an arrow 764) to the beam feature 710 in a direction toward the enclosure 702. During a bonding operation, the bonding tool 750 may cause metal oxides of both the beam feature 710 and the enclosure 702 to break down in a joint region generally defined by a bonding location between the beam feature 710 and the enclosure 702. This causes a diffusion bond, and atoms of the beam feature 710 and the enclosure 702 may intermingle and diffuse into one another. Also, the textured region 722 of the interior region of the enclosure 702 along with a textured region of the bonding tool 750 direct ultrasonic energy to the joint region where the beam feature 710 bonds with the enclosure 702.

Figure 20:
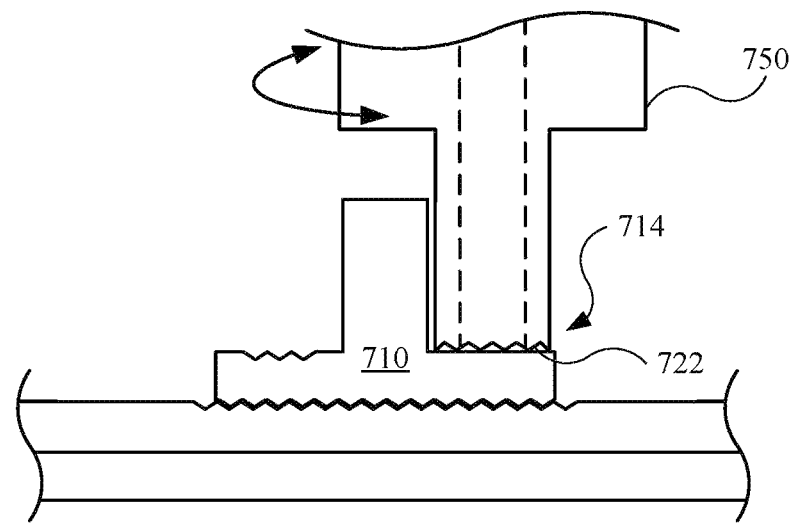
FIG. 20 illustrates a side view of the beam feature shown in FIG. 19 with the beam feature bonding with the enclosure.

FIG. 20 illustrates a side view of the beam feature 710 shown in FIG. 19 with the bonding tool 750 performing a welding operation to a second region 714 of the beam feature 710. Although not shown, the bonding tool 750 may perform several additional welding operations to the beam feature 710. For example, the bonding tool 750 may perform welding operations to regions opposite the first region 712 and the second region 714. However, due in part to the rotational motional of a torsional ultrasonic welding tool, subsequent welds do not disturb prior welds, preventing the beam feature 710 from detaching or breaking off of the enclosure 702 along the prior welds, and all welds of beam feature 710 combine to maintain the beam feature 710 with the enclosure 702.

Figure 21:
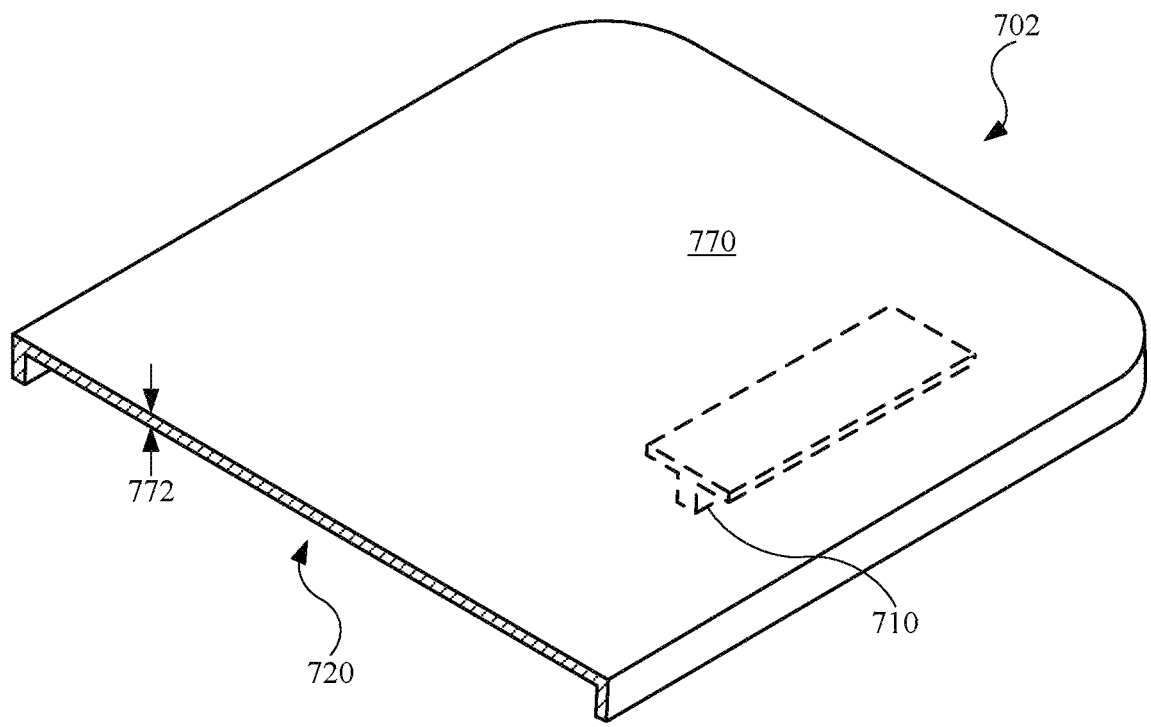
FIG. 21 illustrates an isometric view of an exterior region of the enclosure shown in FIG. 21.

FIG. 21 illustrates an isometric view of an exterior region 770 of the enclosure shown in FIG. 21. For purposes of illustration, the textured region is not shown. Despite the torsional ultrasonic welding process previously described, the beam feature 710 is bonded to the interior region 720 without leaving any visible mark or trace on the exterior region 770. Also, in some embodiments, the thickness 772 of the enclosure is 3 millimeters or less. Further, in some embodiments, the thickness 772 is 1 millimeter or less. In either event, the exterior region 770 is free of any marks or traces. This allows for an electronic device that includes an enclosure 702 with several structural enhancements while still providing an aesthetic finish.

Figure 22:
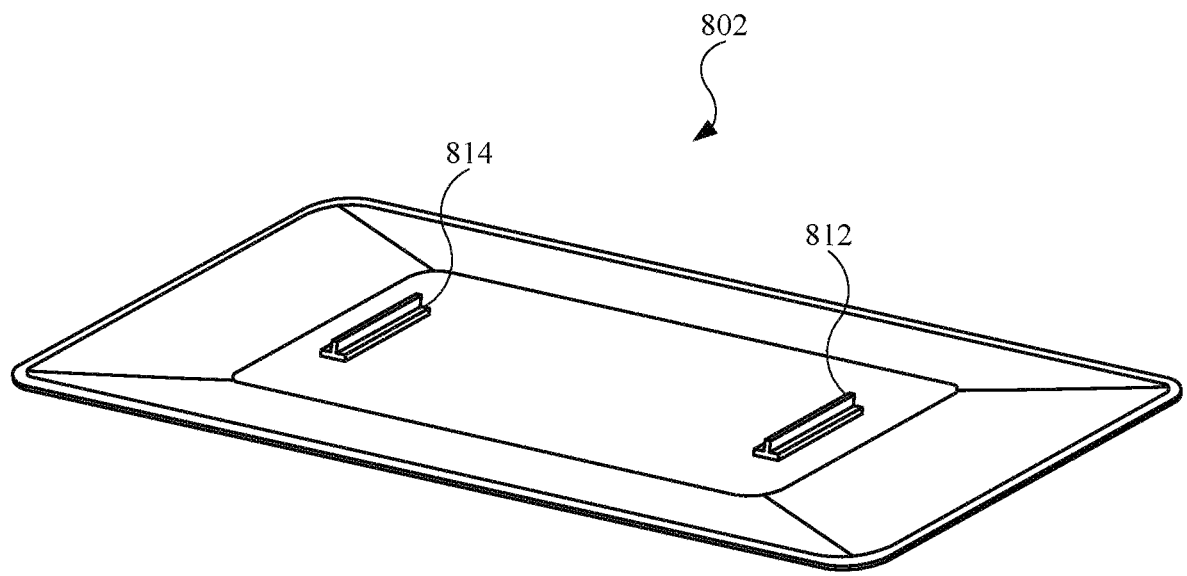
FIG. 22 illustrates an isometric view of multiple beam features secured with an enclosure using a bonding process.

FIG. 22 illustrates an isometric view of multiple beam features secured with an enclosure 802 using a bonding operation. The bonding operation may be a torsional ultrasonic welding process previously described. As shown, a first beam feature 812 and a second beam feature 814, disposed in the enclosure 802, may serve multiple functions. For example, the first beam feature 812 and the second beam feature 814 can support a component, such as a display panel 106 (shown in FIG. 1) when the enclosure 802 is a display housing. Also, the first beam feature 812 and the second beam feature 814 can be used to dissipate or transfer heat away from heat-generating components thermally coupled with one or both of the beam features. Also, although not shown, any of the protruding features 510 (shown in FIG. 14) may be disposed throughout the enclosure 802 and used in conjunction with the first beam feature 812 and/or the second beam feature 814.

Figure 23:
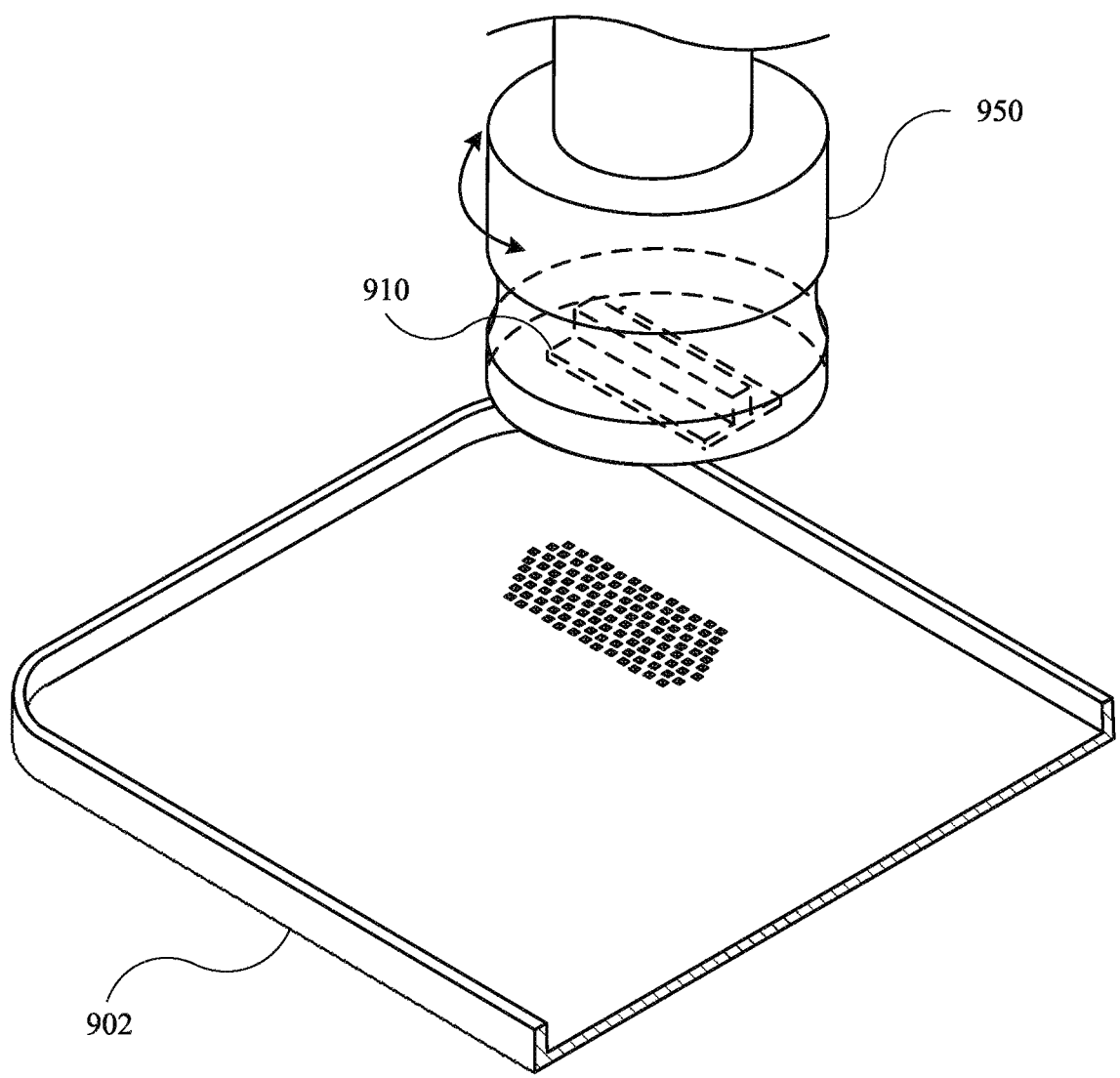
FIG. 23 illustrates an isometric view of an alternate embodiment of a bonding tool.

As shown in FIGS. 18-20, the bonding tool 750 may be designed to perform "spot welds" in local regions of the beam feature 710. However, other bonding tools may be designed to receive the entire beam feature. For example, FIG. 23 illustrates an isometric view of an alternate embodiment of a bonding tool 950. The bonding tool 950 may also be a torsional bonding tool having a cavity or opening designed to substantially receive a beam feature 910 and actuate the beam feature 910 in a rotational motion in a manner previously described. Further, the bonding tool 950 may be designed to provide ultrasonic energy across an entire length of the beam feature 910, as opposed to a spot welding operation. This may allow welding of the beam feature 910 with the enclosure 902 in a single bonding operation. Also, although not shown, in some embodiments, the bonding tool 950 includes a linear bonding tool designed to provide ultrasonic energy to the beam feature 910 back and forth along a linear path, in accordance with the described embodiments.

Figure 24:
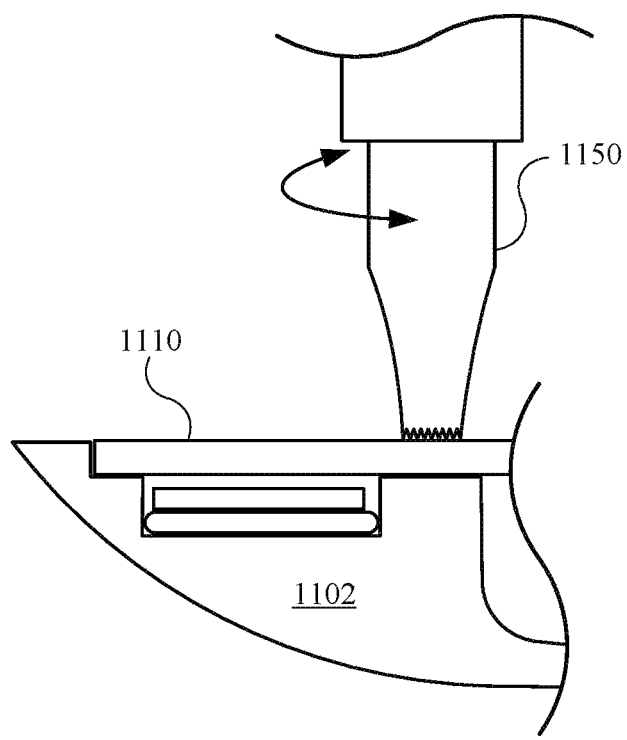
FIG. 24 illustrates a side view of an embodiment of an attachment feature undergoing a bonding operation to secure the attachment feature with an enclosure, in accordance with the described embodiments.

A torsional ultrasonic welding tool can perform additional bonding operations. For example, FIG. 24 illustrates a side view of an embodiment of an attachment feature 1110 undergoing a bonding operation to secure the attachment feature 1110 with an enclosure 1102, in accordance with the described embodiments. The bonding tool 1150 may be a linear ultrasonic welding tool previously described. However, in the embodiment shown in FIG. 24, the bonding tool 1150 is a torsional ultrasonic welding tool. The attachment feature 1110 may be similar to the third attachment feature 236 (shown in FIG. 8) and may extend across the entire length of the enclosure 1102.

Figure 25:
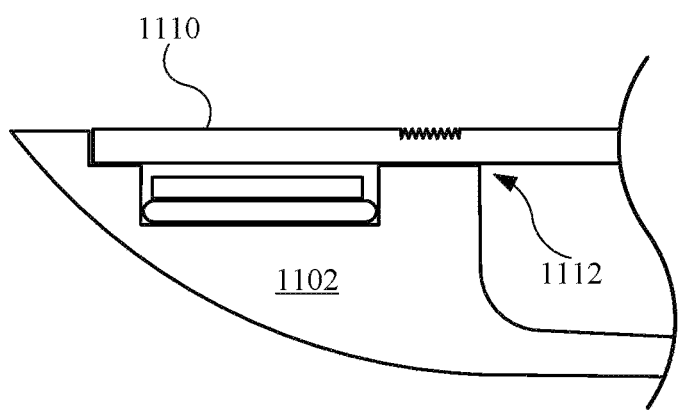
FIG. 25 illustrates the attachment feature shown in FIG. 24 after the bonding process.

FIG. 25 illustrates the attachment feature 1110 shown in FIG. 24 after the bonding operation. As shown, the attachment feature 1110 may be bonded to the enclosure 1102 at a bonding location 1112 between the attachment feature 1110 and the enclosure 1102. The repeated arc-like, or partially circular, movement by the bonding tool 1150 causes the attachment feature 1110 to secure with the enclosure 1102. In particular, during the bonding operation, the bonding tool 1150 (shown in FIG. 24) causes metal oxides of both the attachment feature 1110 and the enclosure 1102 to break down at the bonding location 1112. This causes a diffusion bond, and metal atoms of the attachment feature 1110 and the enclosure 1102 intermingle and diffuse into one another.

Figure 26:
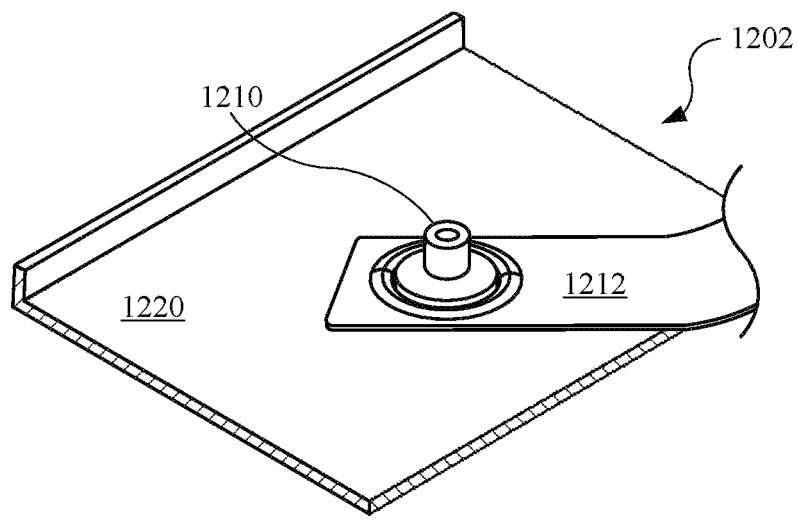
FIG. 26 illustrates an isometric view of a portion of an enclosure having a protruding feature and an intermediate feature secured with an interior region of the enclosure using a bonding process, in accordance with the described embodiments.

The previous embodiments describe techniques for securing a single feature with an enclosure. However, multiple features formed from various materials may be simultaneously secured with an enclosure using a single bonding step. For example, FIG. 26 illustrates an isometric view of a portion of an enclosure 1202 having a protruding feature 1210 and an intermediate feature 1212 secured with an interior region 1220 of the enclosure 1202 using a bonding operation, in accordance with the described embodiments. In some cases, the enclosure 1202, the protruding feature 1210, and the intermediate feature 1212 are formed from a metal, such as aluminum. However, the type of aluminum used in each feature may differ. For example, in some embodiments, the enclosure 1202 includes 7000 series aluminum. Also, in some embodiments, the protruding feature 1210 includes 6000 series aluminum. As such, the enclosure 1202 and the protruding feature 1210 may be an aluminum alloy having a higher strength than that of aluminum alone. Also, in some embodiments, the intermediate feature 1212 includes 1000 series generally associated with a pure aluminum that may have a hardness less than a hardness of the enclosure 1202 and a hardness of the protruding feature 1210. Accordingly, the intermediate feature 1212 may be softer than that of the enclosure 1202 and the protruding feature 1210. This allows for a single bonding operation to co-bond the protruding feature 1210 and the intermediate feature 1212 with the enclosure 1202. It should be noted that other metals may be used with similar relative hardness properties. That is, in some embodiments, the hardness of the intermediate feature 1212 is less than that of the enclosure 1202 and the protruding feature 1210, while a metal other than aluminum or aluminum alloy is used.

The intermediate feature 1212 (partially shown), which may extend along various portions of the enclosure 1202, may be used as an electrical grounding path for a component electrically coupled with the protruding feature 1210 and/or the intermediate feature 1212 when the intermediate feature 1212 is electrically coupled with an electrical ground (not shown). Alternatively, or in conjunction, the intermediate feature 1212 may be used as a heat dissipation path for a component thermally coupled with the protruding feature 1210 and/or the intermediate feature 1212 when the intermediate feature 1212 is thermally coupled with a heat sink (not shown). Also, the intermediate feature 1212 may be formed from another metal or metals having a strength or hardness less than that of the enclosure 1202 and the protruding feature 1210. For example, the intermediate feature 1212 may include copper.

Figure 27:
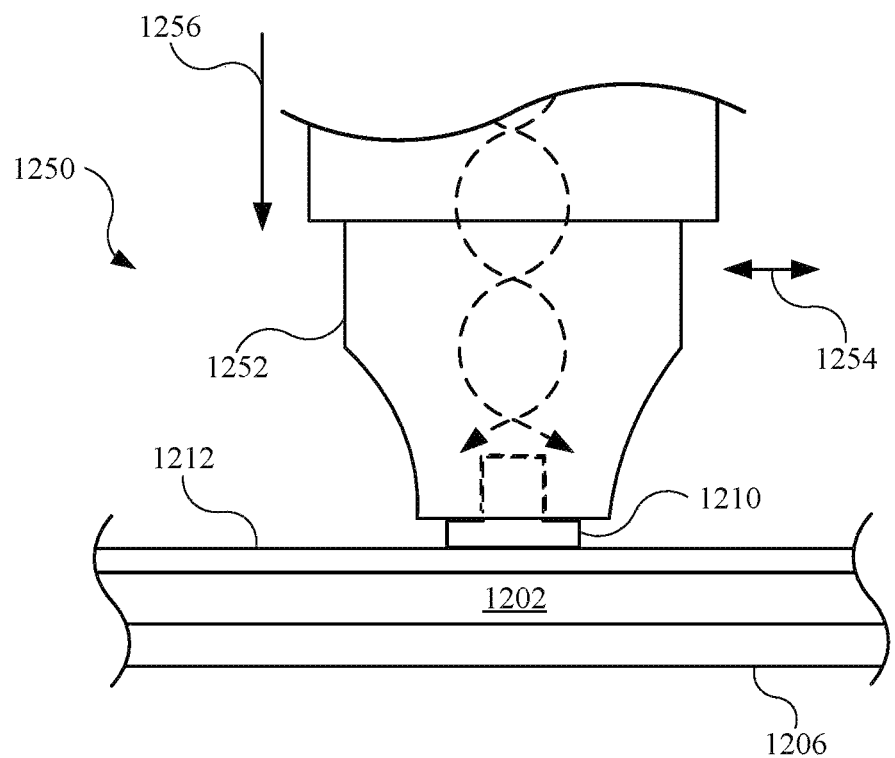
FIG. 27 illustrates a side view of the protruding feature and the intermediate feature shown in FIG. 26 undergoing a bonding operation to secure the protruding feature and the intermediate feature with the enclosure.
Figure 28:
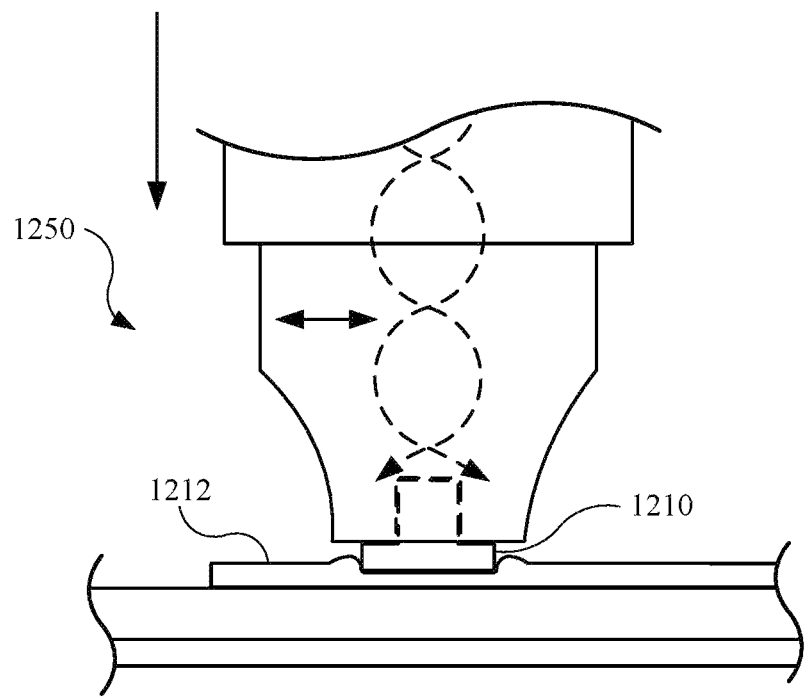
FIG. 28 illustrates a side view of the protruding feature and the intermediate feature shown in FIG. 27 further undergoing the bonding operation.
Figure 29:
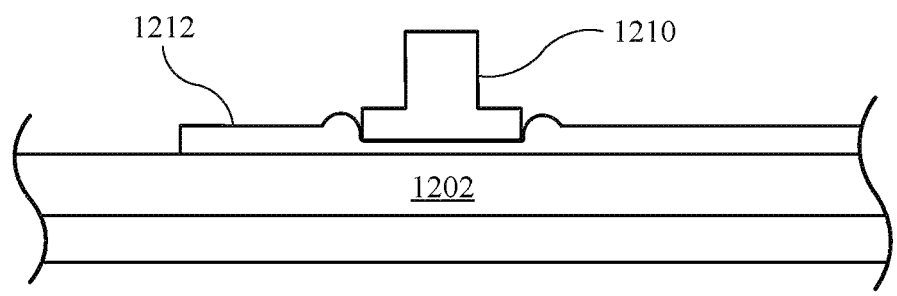
FIG. 29 illustrates a side view of the protruding feature and the intermediate feature secured with the enclosure.

FIGS. 27-29 illustrate a solid-state bonding process that may be used to directly bond the protruding feature 1210 and the intermediate feature 1212 with the enclosure 1202, as shown in FIG. 26. FIG. 27 illustrates a side view of the protruding feature 1210 and the intermediate feature 1212 undergoing a bonding operation to secure the protruding feature 1210 and the intermediate feature 1212 with the enclosure 1202. As shown, a bonding tool 1250 engages the protruding feature 1210. In some embodiments, the bonding tool 1250 is a linear ultrasonic welding tool having an ultrasonic horn 1254 capable of actuating along an axis defined by a linear path (denoted by a first arrow 1) and delivering ultrasonic energy to the protruding feature 1210 and the intermediate feature 1212 in a manner previously described. For additional support, a fixture 1206 may be used to affix the enclosure 1202 in a stationary position during the bonding operation. During the bonding operation, the bonding tool 1250 causes metal oxides of both the protruding feature 1210, the intermediate feature 1212, and the enclosure 1202 to break down in joint regions generally defined by a bonding location between 1) the protruding feature 1210 and the intermediate feature 1212, and 2) the intermediate feature 1212 and the enclosure 1202. This causes a diffusion bond, and metal atoms of the protruding feature 1210, the intermediate feature 1212, and the enclosure 1202 intermingle and diffuse into one another. Also, although not shown, a textured region (previously described) of the enclosure 1202 and the textured region of the bonding tool 1250 may be used facilitate the bonding operation by directing energy in the form of ultrasonic energy to the joint regions. Also, in addition to actuating along the path denoted by the first arrow 1, the bonding tool 1250 may apply a force (denoted by a second arrow 1256) to the intermediate feature 1212 in a direction toward the enclosure 1202.

FIG. 28 illustrates a side view of the protruding feature 1210 and the intermediate feature 1212 shown in FIG. 27, further undergoing the bonding operation. As shown, the bonding operation causes the relatively soft material of the intermediate feature 1212 to shift in locations in which the protruding feature 1210 engages the intermediate feature 1212, due in part to the ultrasonic energy and the force applied to the intermediate feature 1212 by the bonding tool 1250.

FIG. 29 illustrates a side view of the protruding feature 1210 and the intermediate feature 1212 secured with the enclosure 1202 subsequent to the bonding operation shown in FIG. 28. As shown, additional material of the intermediate feature 1212 may shift and build up around the protruding feature 1210. Also, although not shown, the protruding feature 1210 may be a boss and may further include an internal threaded region designed to receive a fastener to secure a component with the enclosure 1202 via the protruding feature 1210. Also, the co-bonding of two more features may also be performed in a manner such that an exterior region (not shown) of the enclosure 1202 does not include any marks, traces, and/or burns associated with the bonding operation.

Figure 30:
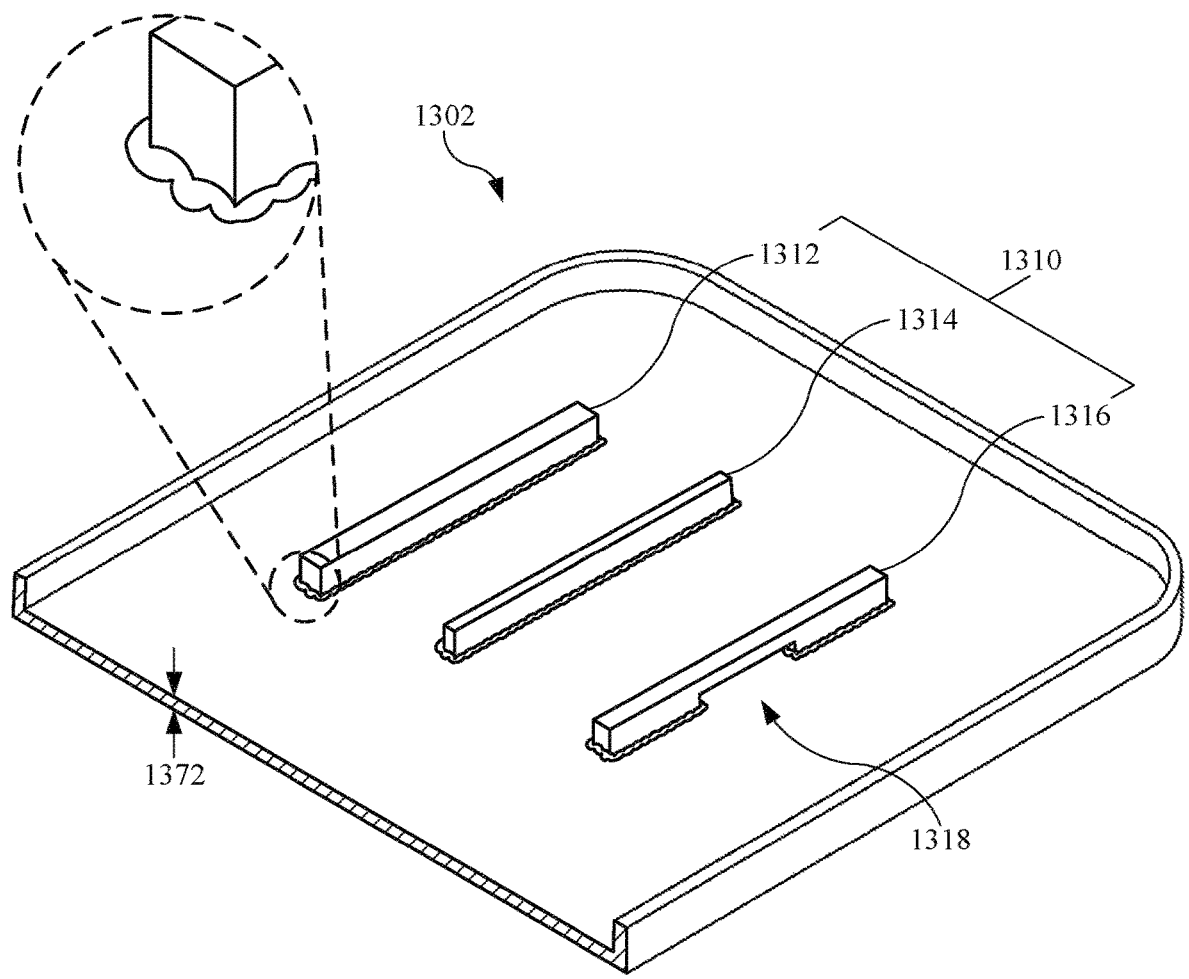
FIG. 30 illustrates an isometric view of several beam features secured with a portion of an enclosure using a bonding process, in accordance with the described embodiments.

Other metallurgic bonding may be used to bond together two or more features to a substrate. FIG. 30 illustrates an isometric view of beam features 1310 secured with a portion of an enclosure 1302 using a bonding operation, in accordance with the described embodiments. The enclosure 1302 may be formed from the first type metal previously described. The beam features 1310 may be formed from the second type metal previously described. However, in other embodiments, the beam features 1310 include aluminum. The beam features 1310 may be used to provide stiffness to the enclosure 1302, particularly when the enclosure 1302 includes a thickness 1372 that is relatively small. A bonding tool (described below) may be designed to apply a relatively large amount of force to each of the beam features 1310 while also applying a linear actuation to each of the beam features 1310. As a result of the relatively large force and the actuation, the beam features 1310 and the enclosure 1302 may soften, but not melt, in a joint region defined by a bonding location between each one of the beam features 1310 and the enclosure 1302. As shown, in the enlarged view, a portion of the first beam feature 1312 may soften during the bonding operation cures around the first beam feature 1312.

The beam features 1310 may include different sizes. For example, a first beam feature 1312 may include a thickness greater than a thickness of a second beam feature 1314. Also, the beam features 1310 may include a portion or portions free of material. For example, a third beam feature 1316 may include an underpass 1318. When one or more of beam features 1310 include an underpass, the beam features 1310 may provide structural support to the enclosure while also providing a channel (defined by the underpasses) allowing one or more structures (such as a cable assembly) to extend through a beam feature having an underpass.

Figure 31:
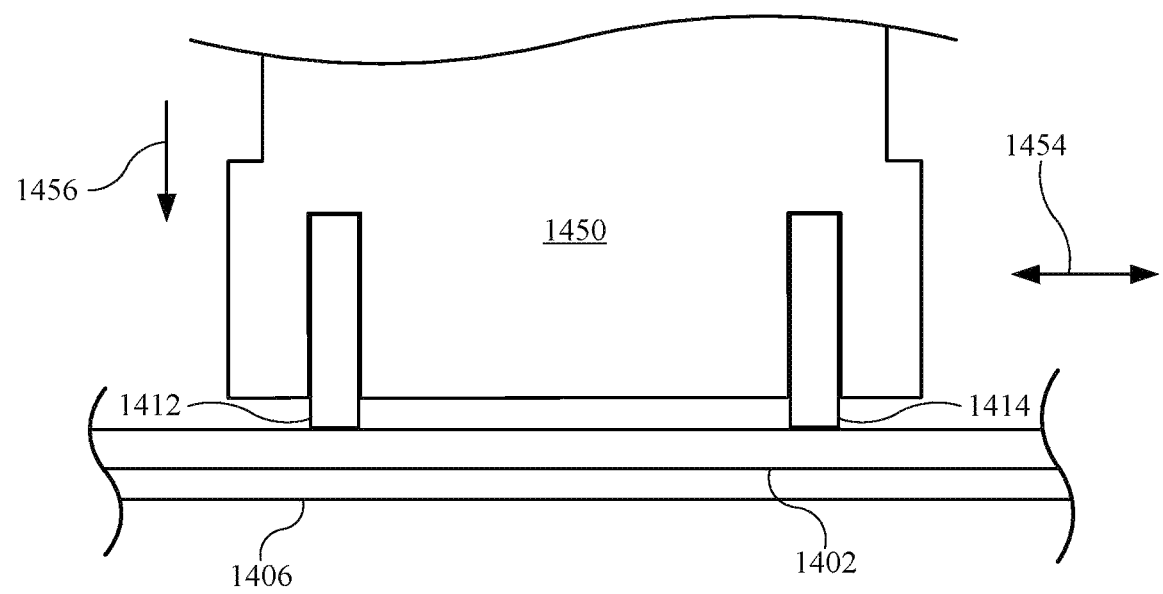
FIG. 31 illustrates a side view of a first beam feature and a second beam feature undergoing a bonding operation to secure the first beam feature and the second beam feature with an enclosure.
Figure 32:
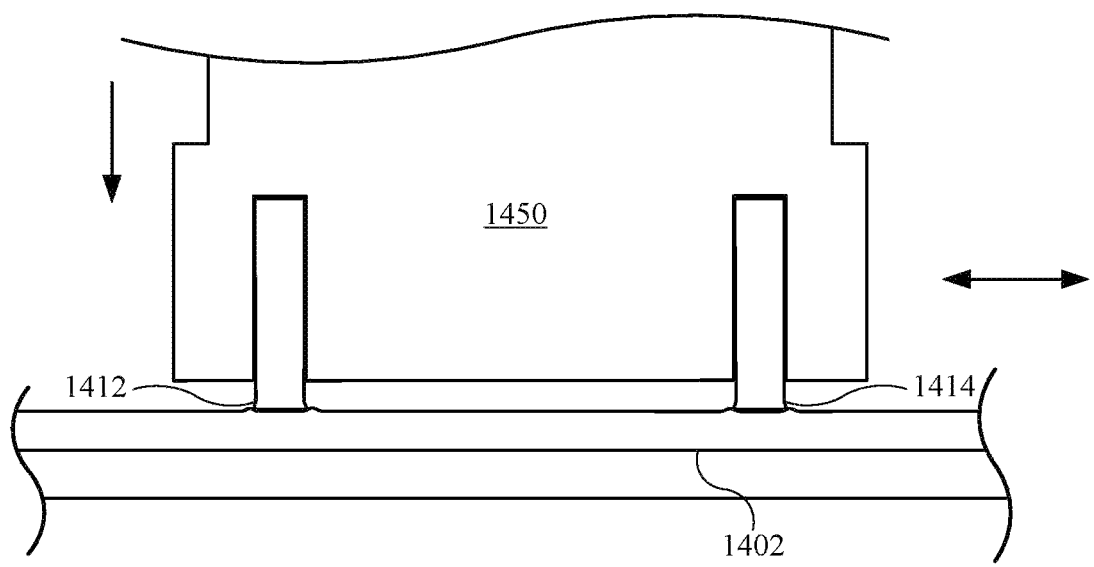
FIG. 32 illustrates a side view of the first beam feature and the second beam feature shown in FIG. 31, further undergoing the bonding process.
Figure 33:
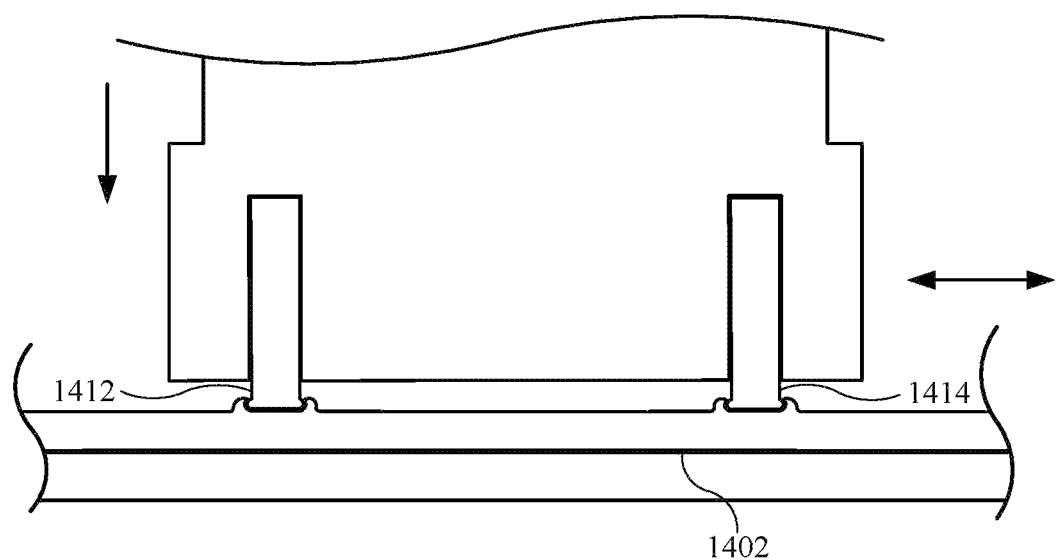
FIG. 33 illustrates a side view of the first beam feature and the second beam feature shown in FIG. 32, further undergoing the bonding process.

FIGS. 31-33 illustrate a solid-state bonding operation capable of directly bonding several beam features, similar to the beam features 1310 shown in FIG. 30. FIG. 31 illustrates a side view of a first beam feature 1412 and a second beam feature 1414 undergoing a bonding operation to secure the first beam feature 1412 and the second beam feature 1414 with an enclosure 1402. As shown, a bonding tool 1450 is used to perform the bonding operation. A fixture 1406 may be used to affix the enclosure 1402 in a stationary position during the bonding operation. In some embodiments, the bonding tool 1450 is a welding tool. In the embodiment shown in FIG. 31, the bonding tool 1450 is a linear friction welding tool. The bonding tool 1450 may be designed to apply a linear actuation (in a direction of a first arrow 1454) as well as provide a force to the first beam feature 1412 and the second beam feature 1414 (denoted by a second arrow 1456) in a direction toward the enclosure 1402. In some embodiments, the force may be at least 1 ton of force. Also, in some embodiments, the bonding tool 1450 may cause a linear actuation of the first beam feature 1412 and the second beam feature 1414 a distance approximately in the range of 0.8 mm to 2 mm. In some cases, the linear actuation is about 1 mm. While the embodiment shown in FIG. 31 includes multiple beam features, in other embodiments, the bonding tool 1450 is designed to perform a linear friction weld to a single beam feature. Still, in other embodiments, the bonding tool 1450 is designed to perform a linear friction weld to three or more beam features.

FIG. 32 illustrates a side view of the first beam feature 1412 and the second beam feature 1414 shown in FIG. 31, further undergoing the bonding operation. As shown, the enclosure 1402, the first beam feature 1412, and the second beam feature 1414 begin to soften between a first joint region between the first beam feature 1412 and the enclosure 1402, as well as a second joint region between the second beam feature 1414 and the enclosure 1402. FIG. 33 illustrates a side view of the first beam feature 1412 and the second beam feature 1414 shown in FIG. 32, further undergoing the bonding operation. The first beam feature 1412 and the second beam feature 1414 may continue to soften at the first joint region and the second joint region, respectively. Also, the enclosure 1402 may undergo an additional softening. The linear friction welding process may continue (or repeat) until the first beam feature 1412 and the second beam feature 1414 are secured with the enclosure 1402 in a desired manner.

Figure 34:
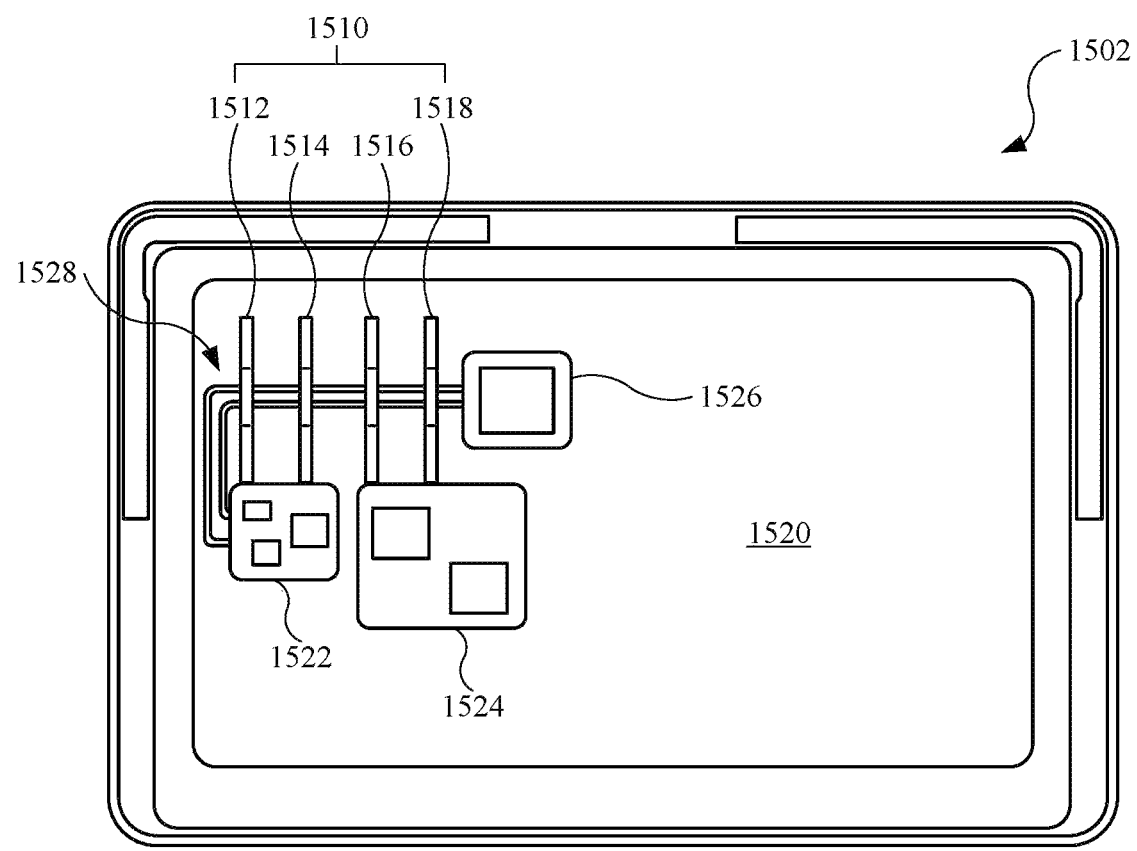
FIG. 34 illustrates several beam features secured with an enclosure for an electronic device, in accordance with the described embodiments.

FIG. 34 illustrates beam features 1510 secured with an interior region 1520 of an enclosure 1502 for an electronic device, in accordance with the described embodiments. The beam features 1510 may be similar to, for example, the beam features shown in FIGS. 30-33. Further, the beam features 1510 may be bonded with the enclosure 1502 by a linear friction welding process previously described. In some embodiments, the enclosure 1502 is a display housing. As shown, the enclosure 1502 may include a first circuit board 1522, a second circuit board 1524, and a third circuit board 1526. The first circuit board 1522 may be electrically coupled with the third circuit board 1526 by a cable assembly 1528 passing through several underpasses (similar to the underpass 1318 shown in FIG. 30) of the beam features 1510. Also, the first circuit board 1522 may be thermally coupled with the first beam feature 1512 and the second beam feature 1514, and the second circuit board 1524 is thermally coupled with the third beam feature 1516 and the fourth beam feature 1518. As such, the first circuit board 1522 may dissipate heat through the first beam feature 1512 and the second beam feature 1514, and the second circuit board 1524 may dissipate heat the third beam feature 1516 and the fourth beam feature 1518. This heat dissipation may allow integrated circuits disposed on the first circuit board 1522 and the second circuit board 1524 to operate within their specified temperatures and perform their desired operations without overheating. Also, although only the interior region 1520 of the enclosure 1502 is shown, the exterior region (opposite the interior region 1520) may be free of any marks, traces, and/or burns associated with the linear friction welding operation, even in instance when a thickness of the enclosure 1502 is a few millimeters or less.

The linear friction welding operation allows an enclosure to undergo a significant material removal operation (based on the linear friction welding), and yet also regain a majority of its original strength and rigidity by the addition of structural features. Also, an entire surface of the beam feature (or features) contacts the enclosure during the operation and accordingly, the weld is made across the entire surface area to form a stronger bond. Further, the manufacturing times for the enclosure may be significantly reduced. For example, rather than performing a selective subtractive machining operation that removes material from the enclosure while allowing some portions (such as structures structure similar to that of a beam feature) of the enclosure to remain, the entire enclosure may undergo a continuous material removal operation followed by a welding. The dual-step operation in the latter scenario may require less overall time than that of the selective subtractive machining operation. This process not only reduces manufacturing time but also uses fewer materials making it a more environmentally friendly process. Further, the beam features may be made from the second type material (previously described) allowing for a more predefined strength and/or cost approach based upon the material (or materials) selected for the beam features.

In some cases, during a linear friction welding operation, it may be desirable to reduce a contact surface of the beam feature. A "contact surface" may be referred to as a surface that engages another surface during a welding operation, and is actuated with respect to another surface. A reduced contact surface may reduce a surface area associated with an interface region between two parts, and in turn, reduce the heat generated during a welding operation. This may also contribute to an exterior region opposite a region associated with the linear friction welding operation from having a mark, trace, and/or burn.

Figure 35:
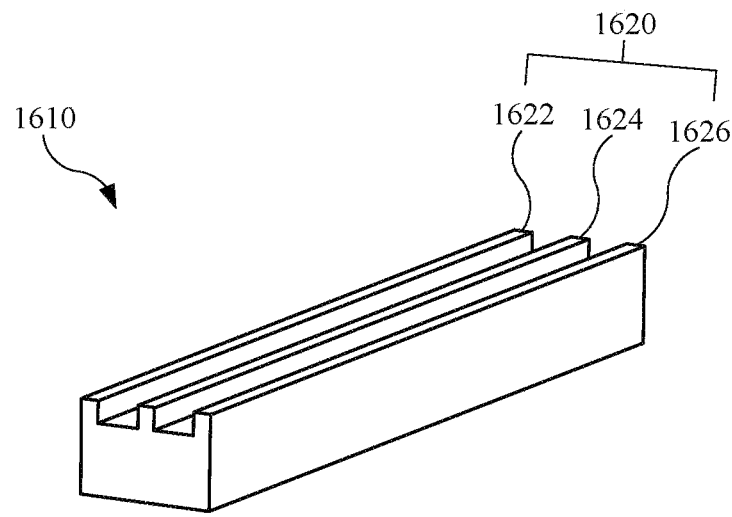
FIG. 35 illustrates an isometric view of an embodiment of a beam feature including several rib features extending along a region the beam feature.
Figure 36:
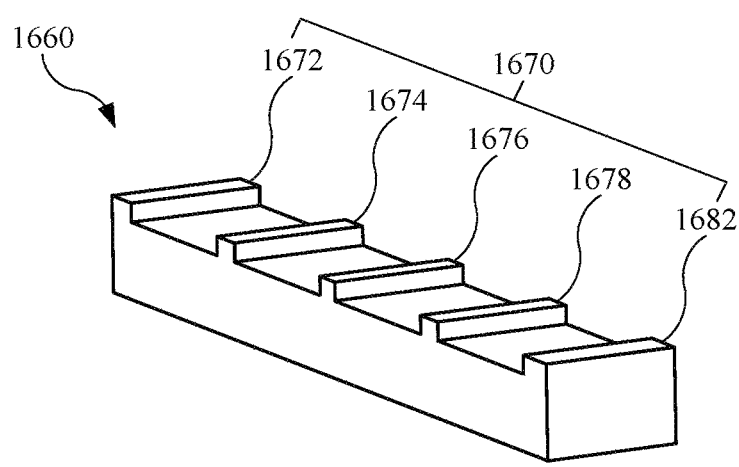
FIG. 36 illustrates an isometric view of an alternate embodiment of a beam feature including several rib features extending along a region of the beam feature.

FIGS. 35 and 36 illustrate embodiments of a beam feature having rib feature designed to reduce the contact surface of the rib feature during a welding operation. Rather than entire side or surface of a beam feature engaging a substrate, the beam features may represent a reduced contact surface of the beam feature. FIG. 35 illustrates an isometric view of an embodiment of a beam feature 1610 including rib features 1620 extending along a region of the beam feature 1610. As shown, a first rib feature 1622, a second rib feature 1624, and a third rib feature 1626 extend lengthwise across the beam feature 1610. Although three rib features are shown, the number of rib features can vary. FIG. 36 illustrates an isometric view of an alternate embodiment of a beam feature 1660 including rib features 1670 extending along a region of the beam feature 1660. As shown, a first rib feature 1672, a second rib feature 1674, a third rib feature 1676, a fourth rib feature 1678, and a fifth rib feature 1682 extend widthwise across the beam feature 1660. Although five rib features are shown, the number of rib features can vary. The rib features shown in FIGS. 35 and 36 may contact an enclosure during a linear friction welding operation between the beam features and the enclosure. Also, while an enclosure may be formed from the first type metal, the beam features shown in FIGS. 35 and 36 may be formed from the second type metal previously described.

Figure 37:
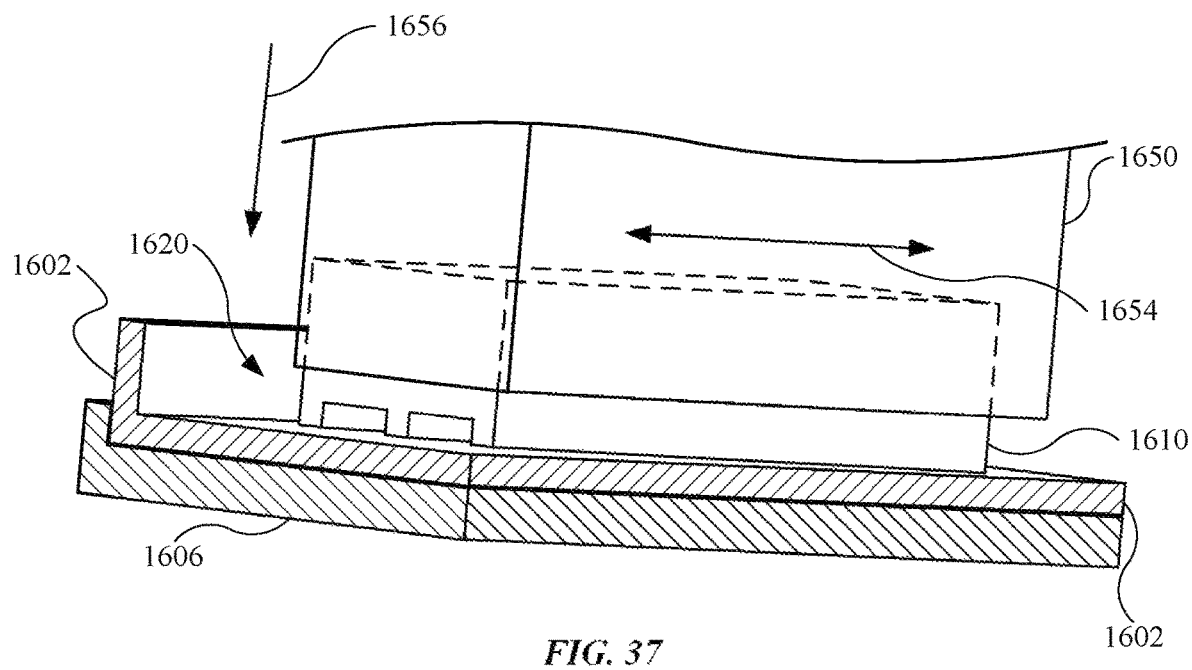
FIG. 37 illustrates an isometric view of the beam feature shown in FIG. 35 undergoing a bonding operation to secure the beam feature with an enclosure.
Figure 38:
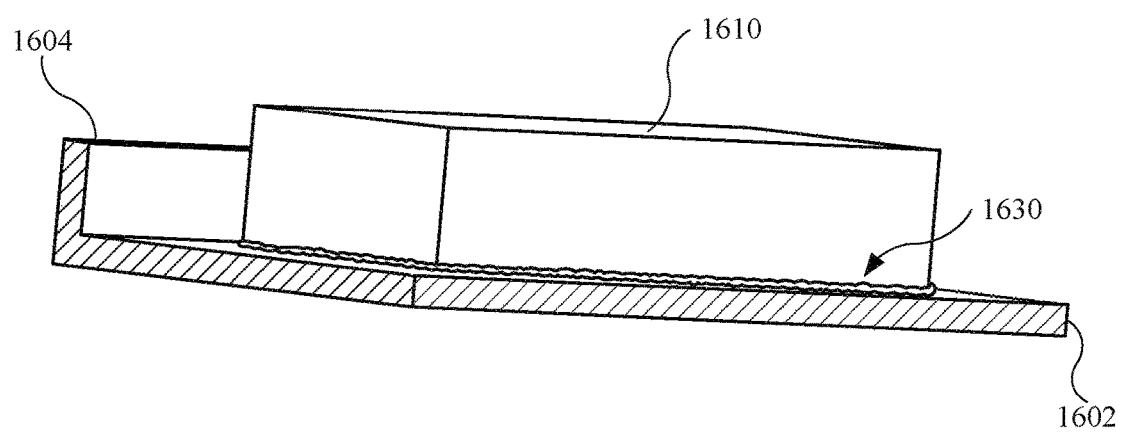
FIG. 38 illustrates an isometric view of the beam feature shown in FIG. 37, subsequent to the beam feature being with the enclosure by the bonding operation.

FIGS. 37 and 38 illustrate a bonding operation for a beam feature having rib features extending across the beam feature. FIG. 37 illustrates an isometric view of the beam feature 1610 shown in FIG. 35 undergoing a bonding operation to secure the beam feature 1610 with an enclosure 1602. A fixture 1606 may be used to affix the enclosure 1602 in a stationary position during the bonding operation. As shown, a bonding tool 1650 applies a linear actuation back and forth (denoted by a first arrow 1654) while also applying a force in a direction (denoted by a second arrow 1656) in a direction toward the enclosure 1602. In some embodiments, the force applied by the bonding tool 1650 in the direction of the enclosure 1602 is at least 1 ton of force or more. Also, in some embodiments, the linear actuation may be approximately in the range of 0.8 mm to 2 mm. FIG. 38 illustrates an isometric view of the beam feature 1610 shown in FIG. 37, subsequent to the beam feature 1610 being with the enclosure 1602 by the bonding operation. As a result of the linear friction welding operation, the rib features 1620 (shown in FIG. 37) significantly soften, but do not melt, to define material 1630 forms around the beam feature 1610. It should be understood that the material previously defined the rib features 1620 in FIG. 37. Accordingly, a height of the beam feature 1610 may be reduced based upon the breakdown or softening of the rib features.

Referring again to FIG. 37, the direction of linear actuation (denoted by the first arrow 1654) of the bonding tool 1650 is substantially parallel with respect to a sidewall 1604 of the enclosure 1602. Further, the rib features 1620 are also substantially parallel with respect to the sidewall 1604. This allows the welding operation to be performed in close proximity to the sidewall 1604 without disturbing the sidewall 1604. As such, the linear friction welding operation allows for flexibility in placement of the beam feature 1610.

Figure 39:
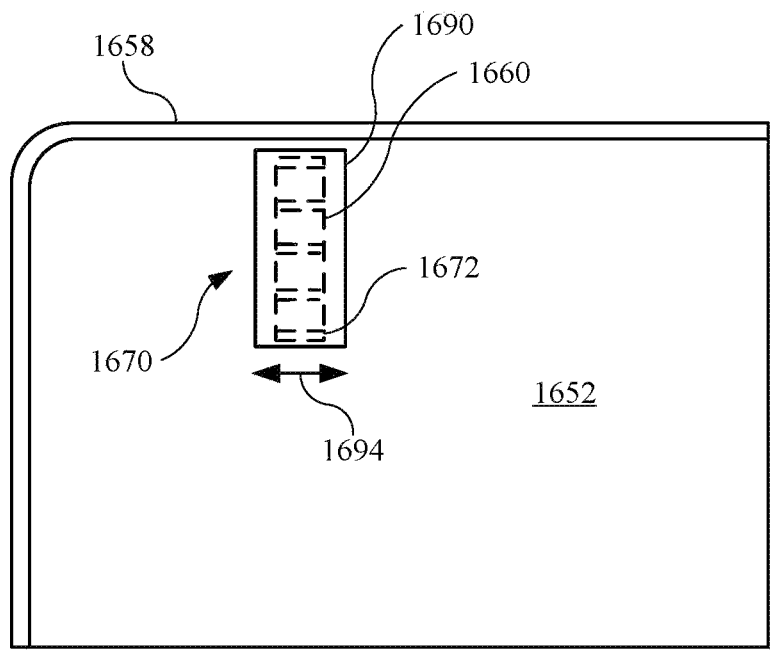
FIG. 39 illustrates a plan view of the beam feature shown in FIG. 36 undergoing a bonding operation to secure the beam feature with an enclosure.
Figure 40:
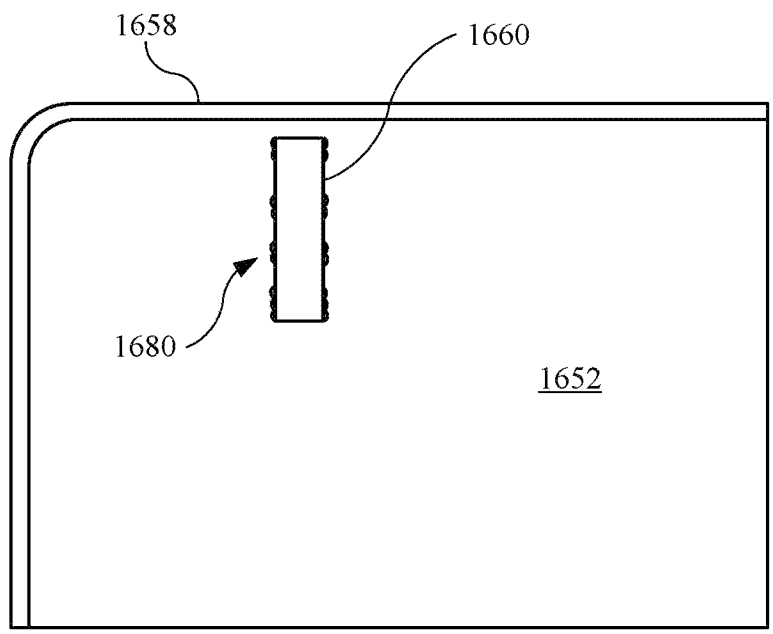
FIG. 40 illustrates a plan view of the beam feature shown in FIG. 39 with the beam feature secured with the enclosure.

FIG. 39 illustrates a plan view of the beam feature 1660 shown in FIG. 36 undergoing a solid-state bonding operation to directly secure the beam feature 1660 with an enclosure 1652. A bonding tool 1690 having the same linear actuation and downward force (toward the enclosure 1652) as that of the bonding tool 1650 (shown in FIG. 37) may be used. As shown, the rib features 1670, such as the first rib feature 1672 (widthwise), and the linear actuation (denoted by the arrow 1694) of the bonding tool 1690 are substantially parallel with respect to a sidewall 1658 of the enclosure 1652. FIG. 40 illustrates a plan view of the beam feature 1660 shown in FIG. 39 with the beam feature 1660 secured with the enclosure 1652 by the bonding operation. The rib features 1670 (shown in FIG. 39) soften during the bonding operation, but do not melt, and material 1680 previously defining the rib features 1670 forms around the beam feature 1660. The widthwise configuration allows the rib features 1670 (shown in FIG. 39) along with the linear actuation of the bonding tool 1690, both of which are parallel with respect to the sidewall 1658, allow for the beam feature 1660 to be in close proximity with respect to the sidewall 1658. Also, although not shown, the beam features shown in FIGS. 37-40 may include an underpass (similar to the underpass 1318 shown in FIG. 30).

Also, although not shown, the beam features (with or without rib features) previously described offer additional advantages, particularly when the available tools limit a desired configuration. For example, an enclosure including a sidewall may further include a beam feature, welded to the enclosure by welding operation and capable of combining with the sidewall at a right angle with respect to the sidewall. In another example, during a material removal process, a cutting tool, such as a T-cutting tool, designed to make an undercut to form or define, for example, a lip region may be too large based upon the size of the beam feature or the sidewall. In other words, a cutting operation defined by the T-cutting tool may remove more material than desired. However, a welding operation may be able to "add back" a feature and the structural configuration is formed to a desired specification. For example, a beam feature having a pre-cut or a pre-formed indention to define a lip region, may be welded to the enclosure. In yet another example, two beam features may be welded together to define a square corner, that is, the two beam features may define a right angle. This may be advantageous over a cutting operation that includes a circular cutting tool that defines a corner having a radius that includes a rounded, or non-square, corner, as the circular cutting tool may not be able to form a sharp right angle.

Figure 41:
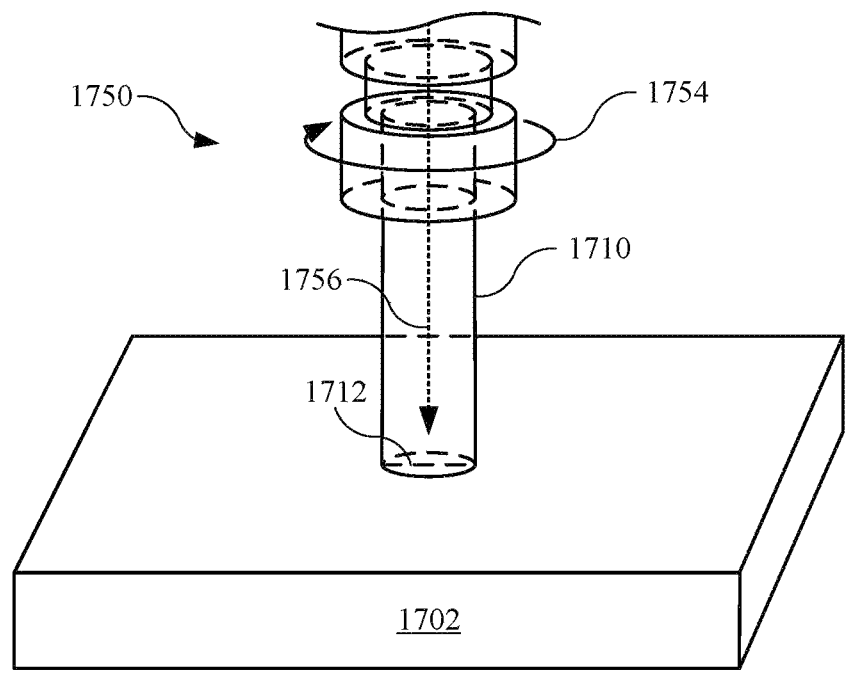
FIG. 41 illustrates an isometric view of an embodiment of a protruding feature undergoing a bonding operation by bonding tool to bond the protruding feature with an enclosure, in accordance with the described embodiments.

In some cases, a bonding operation may be used to drive a bonded feature below a bonding surface of an enclosure. For example, FIG. 41 illustrates an isometric view of an embodiment of a protruding feature 1710 undergoing a solid-state bonding operation by a bonding tool 1750 to directly bond the protruding feature 1710 with an enclosure 1702, in accordance with the described embodiments. It will be appreciated a portion of the enclosure 1702 is represented, and the enclosure 1702 may take on any structural component previously described for an enclosure. Also, the enclosure 1702 may include the first type material (previously described), and the protruding feature 1710 may include the second type material (previously described). In some embodiments, the bonding tool 1750 is a rotary tool designed for a high speed rotational movement and may be capable of performing a rotational inertial friction welding operation. For example, the bonding tool 1750 may include a rotary speed of 100,000 revolutions per minute (RPMs) or higher. As shown, the bonding tool 1750 is capable of rotating the protruding feature 1710 in a generally circular motion (shown by the arrow 1754) about a longitudinal axis defined by a centerline 1756 extending through the protruding feature 1710. Also, in some embodiments, the protruding feature 1710 includes a diameter 1712 of 6 mm or less. Further, in some embodiments, the protruding feature 1710 includes a diameter 1712 of 2 mm or less. The relatively small surface area of the protruding feature 1710, based upon the diameter 1712, provides a relatively small bonding surface (or contact surface) during the bonding operation. However, due to the high speeds of the bonding tool 1750, sufficient heat may be generated to form a bond between the enclosure 1702 and the protruding feature 1710.

Figure 42:
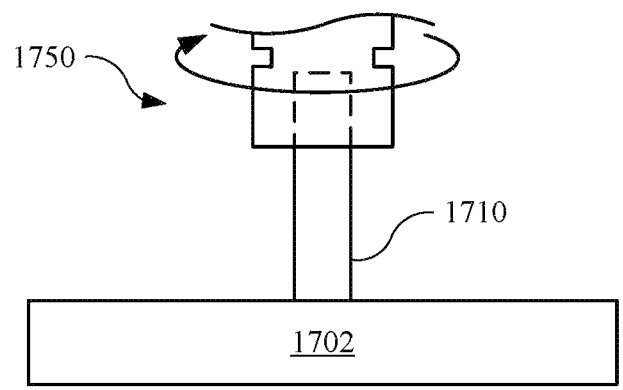
FIG. 42 illustrates a side view of the bonding tool rotating the protruding feature to form a bond between the protruding feature and the enclosure.
Figure 43:
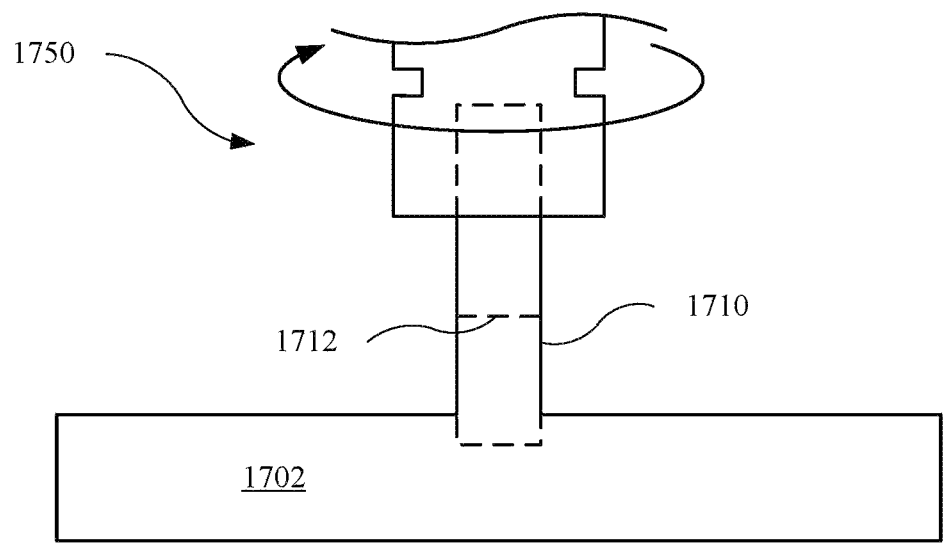
FIG. 43 illustrates a side view showing the protruding feature partially embedded in the enclosure due to the bonding operation.

FIG. 42 illustrates a side view of the bonding tool 1750 rotating the protruding feature 1710 to form a bond between the protruding feature 1710 and the enclosure 1702. Similar to previous bonding operations, the bonding operation shown in FIG. 42 may cause the metal oxides of the protruding feature 1710 and the enclosure 1702 to break down to form a diffusion bond between the atoms of the protruding feature 1710 and the enclosure 1702, as both enclosure 1702 and the protruding feature 1710 begin to soften, but not melt, at a joint region defined by a region between and around the enclosure 1702 and the protruding feature 1710. However, in this bonding operation, the bonding tool 1750 is designed to provide a force to the protruding feature 1710 to "sink" or cause a portion of the protruding feature 1710 to be disposed below a surface of the enclosure 1702. For example, FIG. 43 illustrates a side view showing the protruding feature 1710 partially embedded in the enclosure 1702 due to the bonding operation. The bonding tool 1750 may include additional features to assist the bonding operation. For example, the bonding tool 1750 may be precisely timed to stop the bonding operation when the enclosure 1702 and the protruding feature 1710 solidify. Further, despite the diameter 1712 of the protruding feature 1710 being relatively small, the bonding tool 1750 is designed to provide an inertial force that does not break the protruding feature 1710. This is due in part to a spindle within the bonding tool 1750 disengaging at a moment when, for example, the bonding operation is complete.

Figure 44:
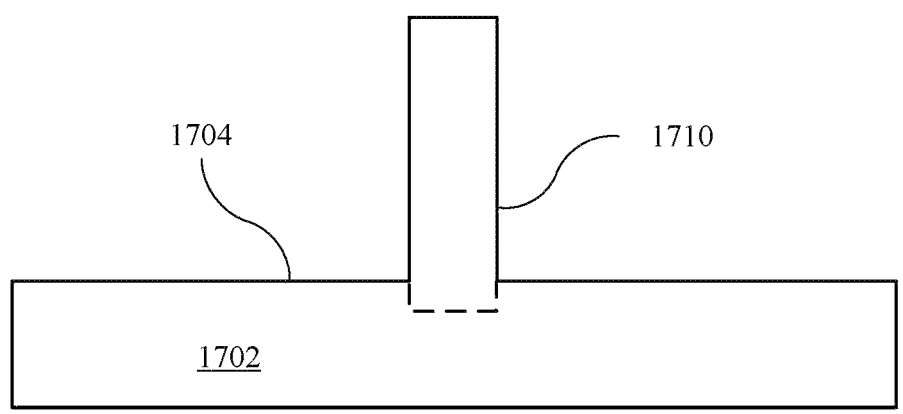
FIG. 44 illustrates a side view of the protruding feature bonded with the enclosure.

FIG. 44 illustrates a side view of the protruding feature 1710 bonded with the enclosure 1702. As shown, a portion of the protruding feature 1710 is disposed below a surface 1704 of the enclosure 1702. Additional processes may be performed to the protruding feature 1710. For example, the protruding feature 1710 may undergo a material removal operation (not shown) to define an internal cavity. Further, in some embodiments, the internal cavity, when formed, includes a threaded internal cavity designed to receive a threaded fastener.

The embodiments described herein illustrates various features. In some embodiments, an electronic device may include several features combined into the electronic device. For example, in some embodiments, the electronic device includes at least an attachment feature (such as the first attachment feature 232 shown in FIG. 2), a protruding feature (such as the first protruding feature 512 shown in FIG. 10), a beam feature (such as the beam feature 710 shown in FIG. 17). Further, an embodiment of an electronic device may include two or more of each of the aforementioned features.

Figure 45:
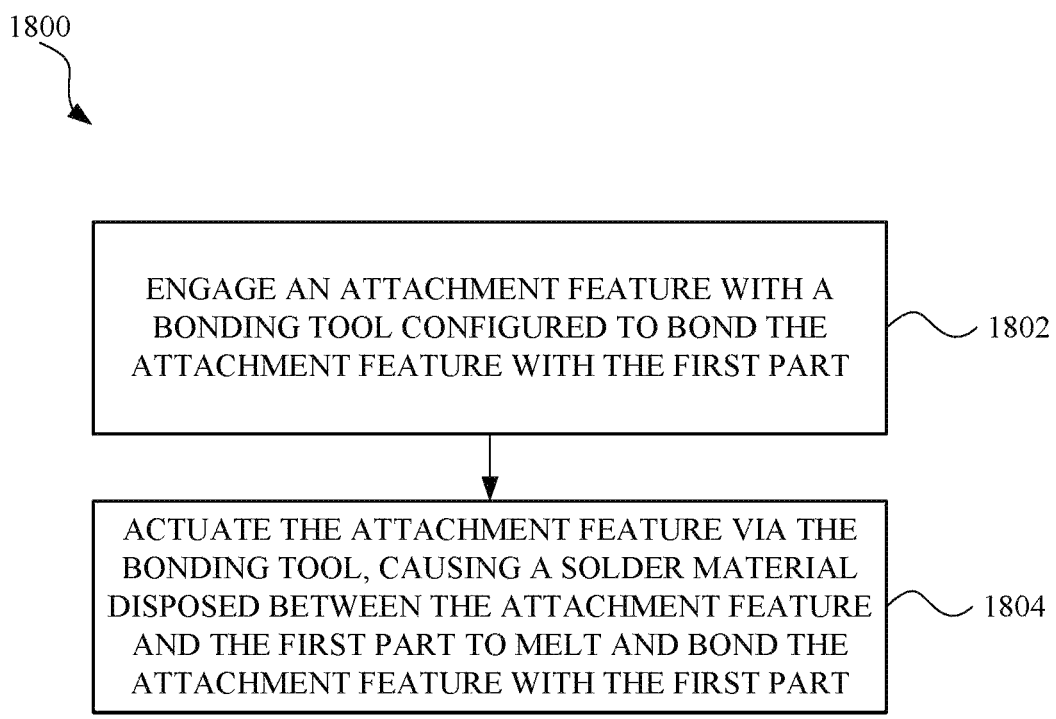
FIG. 45 illustrates a flowchart showing a method for forming an electronic device, in accordance with the described embodiments.

FIG. 45 illustrates a flowchart 1800 showing a method for forming an electronic device having an enclosure that includes a first part and a second part rotatably coupled with the first part, in accordance with the described embodiments. The first part and the second may be part of an enclosure for the electronic device. For example, the first part may include a display housing, and the second part may include a base portion. Accordingly, in some embodiments, the second part may include a magnet.

In step 1802, an attachment feature is engaged with a bonding tool configured to bond the attachment feature with the first part. The bonding tool may include an ultrasonic bonding tool designed to transmit ultrasonic energy to the attachment feature when engaged with the attachment feature. In this regard, the bonding tool may vibrate or move at ultrasonic frequencies of 10 kHz or more.

In step 1804, the attachment feature is actuated via the bonding tool. The actuation may be due in part to the ultrasonic energy generated from the bonding tool. The actuation by the bonding tool may pass through the attachment feature. This may cause a solder material disposed between the attachment feature and the first part to melt and bond the attachment feature with the first part. In some embodiments, in a closed configuration between the first part and the second part, the attachment feature magnetically couples with the magnet to define a magnetic circuit, and the first part is separated from the second part by a gap that is based upon the magnetic circuit.

Figure 46:
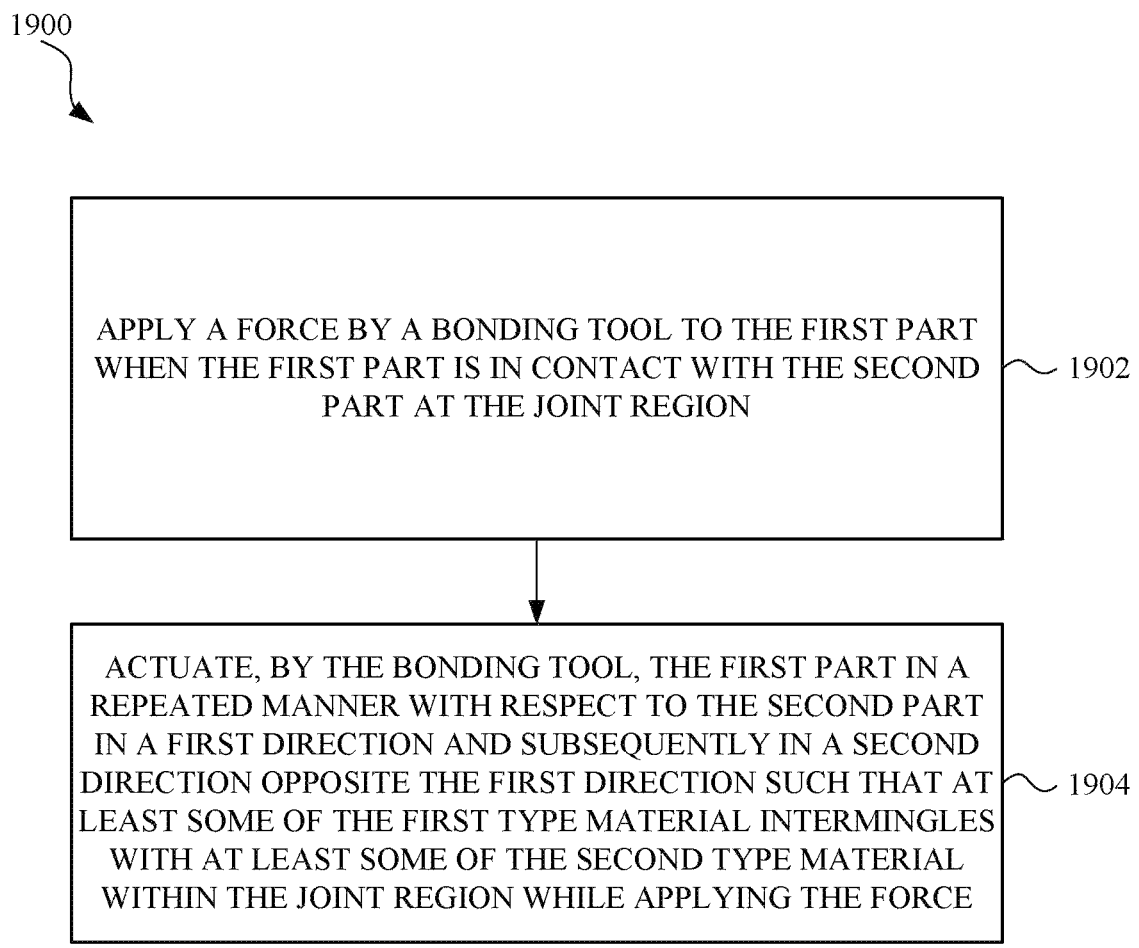
FIG. 46 illustrates a flowchart showing a method for forming an electronic device having an enclosure that includes a first part and a second part rotatably coupled with the first part, in accordance with the described embodiments.

FIG. 46 illustrates a flowchart 1900 showing a method for forming an electronic device having an enclosure that includes a first part and a second part rotatably coupled with the first part, in accordance with the described embodiments. The first part may be formed of a first type material and the second part formed from a second type material dissimilar to the first type material. As an example, the first type material may include aluminum or an aluminum alloy, and the second type material may include titanium, molybdenum, stainless steel, brass, bronze, or the like. Also, the first part may include an enclosure of the electronic device. Also, the second part may include, for example, an attachment feature, a protruding feature, or a beam feature, in accordance with the described embodiments.

In step 1902, a force is applied by a bonding tool to the first part when the first part is in contact with the second part at the joint region. The bonding tool may include an ultrasonic bonding tool. Further, the bonding tool may be capable of bonding operations such as linear ultrasonic welding, torsional ultrasonic welding, and/or linear frictional welding.

In step 1904, the first part is actuated by the bonding tool in a repeated manner with respect to the second part in a first direction and subsequently in a second direction opposite the first direction such that at least some of the first type material intermingles with at least some of the second type material within the joint region while applying the force. The first and second directs may include a "back and forth" motion along a linear path, or along a partially circular path.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A laptop computing device comprising:
a display housing;
a display panel positioned at least partially within the display housing; and
a base portion rotatably coupled to the display housing and comprising:
a first component having a lower portion that defines a lower exterior surface of the laptop computing device, the first component formed from a first material; and
a second component having an upper portion that defines an upper exterior surface and bonded to the lower portion, the second component formed from a second material that is different than the first material, the upper exterior surface defining a keyboard region.

2. The laptop computing device of claim 1, wherein:
the first material of the first component is an aluminum material; and
the second component is bonded to the aluminum material of the first component by a third material.

3. The laptop computing device of claim 2, wherein the third material is a glass material.

4. The laptop computing device of claim 1, wherein:
the first component has a sidewall that at least partially surrounds the lower portion;
the sidewall defines an uppermost surface;
the second component defines a lower surface that is opposite to the upper exterior surface; and
the lower surface of the second component contacts the uppermost surface of the first component.

5. The laptop computing device of claim 4, wherein:
the first component defines a recess that extends into the uppermost surface;
a glass filler material is positioned in the recess; and
the glass filler material bonds the first component to the second component.

6. The laptop computing device of claim 5, wherein the glass filler material has been heated to at least partially flow around an attachment feature of the first component.

7. The laptop computing device of claim 1, wherein:
the lower portion of the first component has a thickness approximately 1 mm or less;
the lower portion defines an inner surface that is opposite to the lower exterior surface; and
the base portion further comprises a beam feature that is ultrasonically welded to the first component along the inner surface.

8. The laptop computing device of claim 7, wherein the laptop computing device further comprises a keyboard assembly positioned within the keyboard region of the second component.

9. An electronic device comprising:
a base portion having a keyboard;
a display housing rotatably coupled to the base portion; and
a display panel positioned at least partially within the display housing, the display housing comprising:
a first component defining an upper exterior surface of the electronic device and defining at least a portion of a sidewall of the display housing, the first component formed from a first material; and
a second component directly bonded to the sidewall of the first component, the second component formed from a second material that is different than the first material.

10. The electronic device of claim 9, wherein:
the first material is a first metal material; and
the second material is a second metal material different than the first metal material.

11. The electronic device of claim 9, wherein the first component is diffusion bonded to the second component.

12. The electronic device of claim 9, wherein:
the first component defines an uppermost surface that extends inward from the sidewall of the display housing; and
the second component is directly bonded to the uppermost surface of the first component.

13. The electronic device of claim 12, wherein:
an inner surface of the second component is directly bonded to the uppermost surface of the first component; and
the display panel is attached to the second component along the inner surface.

14. The electronic device of claim 9, wherein:
the first component defines an interior surface that is opposite to the upper exterior surface of the electronic device; and
the display housing further comprises a beam feature that is directly bonded to the interior surface of the first component.

15. An enclosure for a laptop computing device, the enclosure comprising:
a display housing configured to receive a display panel; and
a base portion rotatably coupled to the display housing and comprising:
  a first component formed from a first material that defines a lower exterior surface of the laptop computing device and an interior surface that is opposite to the lower exterior surface;
  a second component formed from a second material that defines an upper exterior surface and is attached to the first component to define an enclosed volume; and
  a third component positioned within the enclosed volume and attached to the first component along the interior surface, the third component formed from a third material that is different than the first material.

16. The enclosure of claim 15, wherein:
the first material is an aluminum material;
the third material is a steel material; and
the third component is a beam feature that is ultrasonically welded to the interior surface of the first component.

17. The enclosure of claim 15, wherein:
the third component is a beam feature; and
the beam feature is diffusion bonded to the interior surface of the first component.

18. The enclosure of claim 15, wherein:
the base portion includes a lower region that defines the lower exterior surface and the interior surface;
the lower region has a thickness that is approximately 1 mm or less along the lower region;
the third component is a mounting boss defining internal threads; and
the mounting boss is welded to the interior surface along the lower region.

19. The enclosure of claim 15, wherein:
the first component defines at least a portion of a sidewall;
the sidewall defines an uppermost surface; and
the second component is diffusion bonded to the first component along the uppermost surface.

20. The enclosure of claim 15, wherein:
the base portion is configured to receive a keyboard assembly; and
the base portion includes a touch pad defined along the upper exterior surface of the second component.

* * * * *